United States Patent [19]
Matsumura

[11] Patent Number: 5,881,211
[45] Date of Patent: Mar. 9, 1999

[54] DATA CONVERSION TABLE CHANGING

[75] Inventor: Akira Matsumura, Kyoto, Japan

[73] Assignee: Dainippon Screen Mfg. Co., Ltd., Kyoto, Japan

[21] Appl. No.: 763,118

[22] Filed: Dec. 10, 1996

[30] Foreign Application Priority Data

Dec. 11, 1995 [JP] Japan .................................. 7-346458
Aug. 28, 1996 [JP] Japan .................................. 8-247292

[51] Int. Cl.$^6$ .................................................. B41B 15/00
[52] U.S. Cl. .......................... 395/109; 358/518; 358/519; 358/515; 358/523; 358/296; 358/298
[58] Field of Search .................................. 358/500, 501, 358/518, 523, 524, 519, 515, 296, 298; 395/105, 108, 109, 112; 345/149, 150, 154, 153

[56] References Cited

U.S. PATENT DOCUMENTS

| | | | |
|---|---|---|---|
| 4,929,978 | 5/1990 | Kanamori et la. | 355/38 |
| 5,105,267 | 4/1992 | Hayashi | 358/519 |
| 5,146,328 | 9/1992 | Yamasaka et al. | 358/519 |
| 5,710,871 | 1/1998 | Tadenuma et al. | 395/109 |

*Primary Examiner*—Edward L. Coles
*Assistant Examiner*—Mark Wallerson
*Attorney, Agent, or Firm*—McDermott, Will & Emery

[57] ABSTRACT

In a three-dimensional LUT for color conversion, the values of converted color component data C', M', and Y' are varied for a specific combination of the values of color component data C, M, and Y representing white, and the values of converted data are then changed for other combinations accompanied by the variation with respect to the specific combination. Referring to FIG. 1B, a concrete procedure first calculates variations of the values of color component data C', M', and Y' at step S20, and then selects combinations of the values of color component data C, M, and Y for which the values of color component data C', M', and Y' are not changed, among a plurality of combinations of the values of color component data C, M, and Y at step S22. For colors between white and cyan, magenta, yellow or black, the variations of the values of color component data C', M', and Y' are set to decrease in an increase in distance from a point corresponding to white in a three-dimensional color space at step S24. The procedure then leads Laplace's Equation including the variations and the values of color component data C, M, and Y as variables at step S26, and solves the Laplace's Equation to determine the variations of the values of color component data C', M', and Y' for each combination of the values of color component data C, M, and Y at step S28. This procedure enables the contents of the three-dimensional LUT for color conversion to be changed readily within a short time.

38 Claims, 21 Drawing Sheets

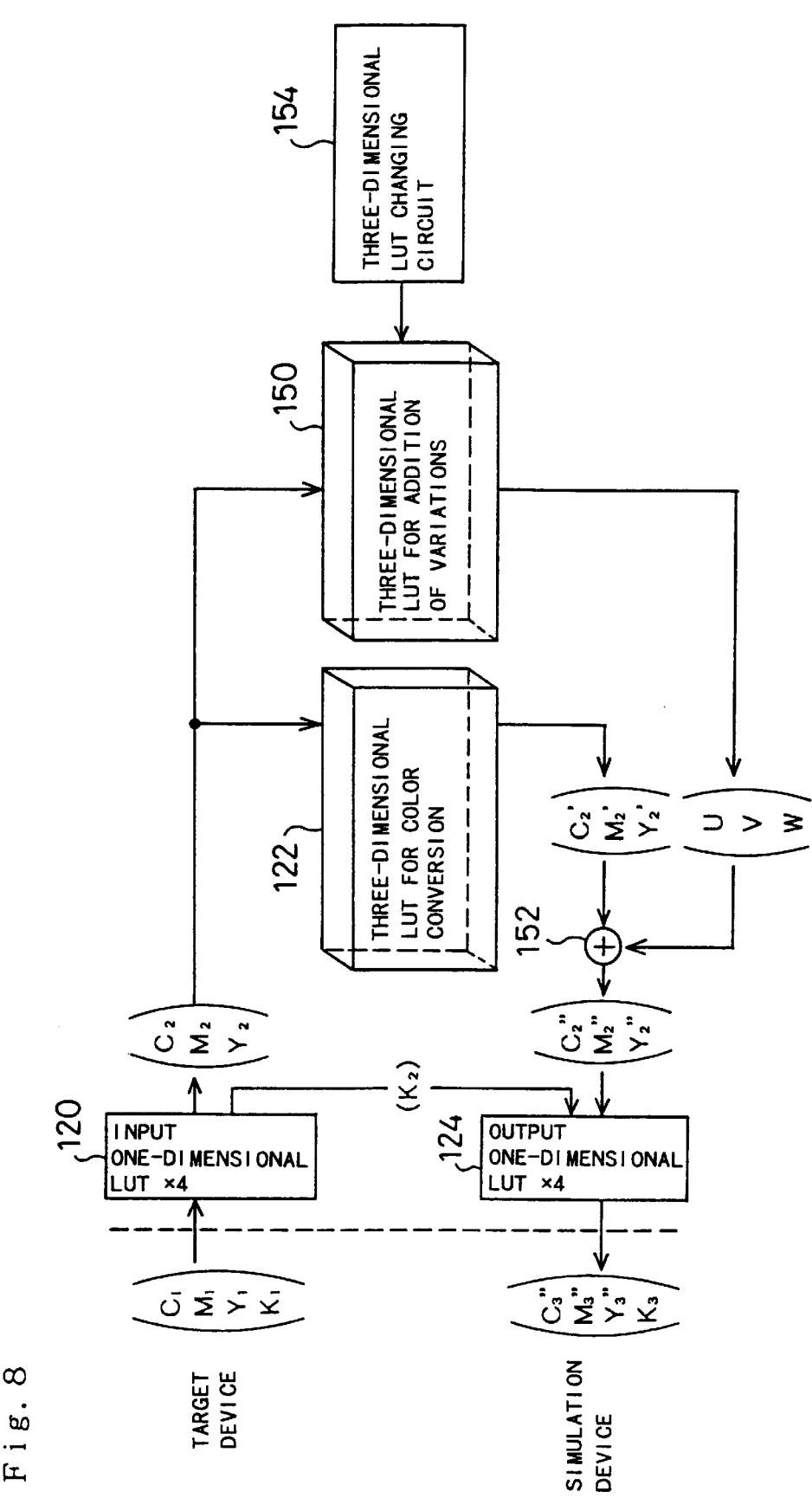

DATA CONVERSION TABLE CHANGING

BACKGROUND OF THE INVENTION

1. Field of the Invention

The present invention relates to a data conversion table that outputs values of at least one piece of converted data according to each of a plurality of combinations of values of three different pieces of color component data. More specifically the present invention pertains to a method of changing a data conversion table, in order to change values of converted data for other combinations with a change in value of converted data for a specific combination among the plurality of combinations of the values of three different pieces of color component data.

2. Description of the Related Art

In the field of printing and prepress, the user generally desires to check the results of printing before producing a mass of prints with a printing machine. Prior to mass printing, the typical procedure produces a small quantity of prints using an economy proof press, such as a thermal sublimation printer or an ink jet printer, to check the results of simulated printing. The color range expressed by prints produced with a printing machine is, however, different from the color range expressed by prints produced with an economy proof press. When image data to be printed are directly given to the economy proof press, it is thereby difficult to check the results of simulated printing accurately. The general procedure accordingly carries out color conversion of image data before feeding the image data to the economy proof press. In accordance with a concrete process, color component data consisting of the image data are input into a look-up table (hereinafter referred to as LUT) for color conversion, and fed to the economy proof press after the color conversion. This makes the color range expressed by the prints produced with the economy proof press substantially identical with the color range expressed by the prints produced with a printing machine. Such color machining enables the economy proof press to give the similar results of printing to those of the printing machine. In the description below, the device such as a printing machine is referred to as a target device, and the device such as an economy proof press as a simulation device.

FIG. 24 is a block diagram illustrating a color conversion apparatus with the LUT for color conversion discussed above. The color conversion apparatus of FIG. 24 primarily includes an LUT element with the LUT for color conversion and an LUT generating element for creating the contents of the LUT for color conversion. The LUT element mainly includes an input one-dimensional LUT 20 for canceling γ correction made on every color component data, cyan (C), magenta (M), yellow (Y), and black (K), a three-dimensional LUT 22 functioning as the LUT for color conversion, and an output one-dimensional LUT 24 for making γ correction on every output color component data C, M, Y, and K. The LUT generating element mainly includes a processing circuit 42 for formation of a polynomial $(1+C+M+Y)n$ of three primary color component data, cyan (C), magenta (M), and yellow (Y), a matrix arithmetic operation circuit 26 for transforming the three primary color component data C, M, and Y to $L^*a^*b^*$ data in an CIE LAB color space, and a gamut mapping circuit 28 for, in case that a specific color can not be reproduced by the simulation device, determining a substitutive color that is visually closest to the specific color and can be reproduced by the simulation device. The LUT generating element further includes a processing circuit 44 for formation of a polynomial $(1+L^*+a^*+b^*)n$ of $L^*a^*b^*$ data, a matrix arithmetic operation circuit 30 for transforming the $L^*a^*b^*$ data to three primary color component data C, M, and Y, and C,M,Y fixed values output circuit 32 for outputting fixed values of the three primary color component data C, M, and Y. The color conversion apparatus is also provided with four switches 34 to 40 for switching the three primary color component data C, M, and Y. The term 'CIE' in the above description represents Commission Internationale de l'Eclairage.

The following describes the process of converting color component data in the LUT element. In a normal operation, the switches 34 and 38 are in contact with the side 'a ', and the LUT element is thus separated from the LUT generating element. The input one-dimensional LUT 20 receives the color component data C, M, Y, and K to be fed to a target device, and cancels γ correction made on every color component data C, M, Y, and K as discussed previously. The color component data C, M, and Y are input into the three-dimensional LUT 22 via the switch 34, whereas the color component data K skip the three-dimensional LUT 22 and are input into the output one-dimensional LUT 24.

The three-dimensional LUT 22 carries out color conversion of the input color component data C, M, and Y and outputs the color-converted data. For distinction, the data of three primary colors C, M, and Y prior to being input into the three-dimensional LUT for color conversion are expressed as C, M, and Y, whereas the data of three primary colors C, M, and Y output from the three-dimensional LUT after the color conversion are expressed as C', M', and Y'.

The three-dimensional LUT 22 stores combinations of the values of color-converted color component data C', M', and Y' corresponding to the combinations of the values of input color component data C, M, and Y. In accordance with a concrete procedure, the three-dimensional LUT 22 receives a combination of the values of input color component data C, M, and Y as an address specifying signal and reads out the corresponding combination of the values of color-converted color component data C', M', and Y'.

In case that the contents of the three-dimensional LUT 22 have been created in a manner discussed below, the color component data C, M, and Y are transformed from a color space proper to a target device to a standard color space not depending upon any device and further to a color space proper to a simulation device via the three-dimensional LUT 22. This enables the simulation device to obtain color component data that can be handled in the common color space with the target device.

In order to reduce the required storage capacity of the three-dimensional LUT 22, the number of combinations of the values of color-converted color component data C', M', and Y' to be stored therein is decreased. The decrease in number of combinations to be stored, however, causes deterioration of the quality of the printing results. In order to prevent deterioration of the quality with the decrease in number of combinations, interpolating arithmetic operations are carried out in the three-dimensional LUT 22 for the combinations not stored therein. The details of the interpolating operations are, for example, disclosed in U.S. Pat. No. 4,275,413.

The color-converted color component data C', M', and Y' output from the three-dimensional LUT 22 are input into the output one-dimensional LUT 24 via the switch 38. The one-dimensional LUT 24 also receives the color component data K output from the input one-dimensional LUT 20, makes γ correction on every input color component data C', M', Y', and K, and outputs the corrected color component data C', M', Y', and K to a simulation device.

The following describes the process of creating the contents of the LUT for color conversion by the LUT generating element. The required measurement data are collected for both the target device and the simulation device, prior to the generation of the LUT for color conversion. Pre-defined, various values of color component data C, M, Y, and K are input into the respective devices for printing, and the results of printing obtained are measured with a spectral colorimeter to yield L*a*b* data. A table of the CMY data and L*a*b* data is then created for each device.

The switch 34 is brought into contact with the side 'b' and the switch 36 with the side 'c', and the color component data C, M, Y, and K, which have been input into the target device, are thereby input into the input one-dimensional LUT 20 shown in FIG. 24. Among the color component data C, M, Y. and K input into the input one-dimensional LUT 20, the three primary color component data C, M, and Y are given to the matrix arithmetic operation circuit 26 for transformation of CMY data to L*a*b* data via the processing circuit 42 for formation of a polynomial, and transformed therein to L*a*b* data by an arithmetic operation using a transformation matrix A defined as Equation (1) given below. The values of L*a*b* data obtained by the transformation are compared with the values of L*a*b* data written in the table that has previously been created for the target device. In order to make the values obtained by the transformation approach the values written in the table, the transformation matrix A used in the matrix arithmetic operation circuit 26 is calculated by the least squares approximation.

$$\begin{bmatrix} L^* \\ a^* \\ b^* \end{bmatrix} = [A] \begin{bmatrix} 1 \\ C \\ M \\ Y \\ C^2 \\ M^2 \\ \vdots \\ \vdots \end{bmatrix} \quad (1)$$

The switch 38 is then brought into contact with the side 'b' and the switch 40 with the side 'c', and the data of the same values as the L*a*b* data written in the table that has previously been created for the simulation device are thereby input into the matrix arithmetic operation circuit 30 for transformation of L*a*b* data to CMY data via the processing circuit 44 for formation of a polynomial. The matrix arithmetic operation circuit 30 transforms the input L*a*b* data to three primary color component data C, M, and Y by an arithmetic operation using a transformation matrix B defined as Equation (2) given below. In order to make the values of color component data C, M, and Y obtained by the transformation approach the values of color component data C, M, and Y written in the table, the transformation matrix B used in the matrix arithmetic operation circuit 30 is calculated by the least squares approximation.

$$\begin{bmatrix} C \\ M \\ Y \end{bmatrix} = [B] \begin{bmatrix} 1 \\ L^* \\ a^* \\ b^* \\ L^{*2} \\ a^{*2} \\ \vdots \\ \vdots \end{bmatrix} \quad (2)$$

The processing circuit 42 or 44 forms a polynomial of the data which are to be input into the matrix arithmetic operation circuit 26 or 30. This procedure enhances the precision of approximation of the CMY to L*a*b* transformation or the L*a*b* to CMY transformation in the matrix arithmetic operation circuit 26 or 30.

After the calculation of the transformation matrices A and B used in the matrix arithmetic operation circuits 26 and 30, the switches 36 and 40 are respectively brought into contact with the side 'd', so that predetermined, various fixed values of three primary color component data C, M, and Y are output from the C,M,Y fixed values output circuit 32. The output data C, M, and Y are processed by the formation of a polynomial, the CMY to L*a*b* transformation, the gamut mapping, the formation of a polynomial, and the L*a*b* to CMY transformation in this order, and successively written into the three-dimensional LUT 22.

These steps create the contents of the three-dimensional LUT 22 functioning as the LUT for color conversion. Conversion of color component data C, M, and Y by the three-dimensional LUT 22 thus prepared is equivalent to implementation of the above processing for the color component data.

The contents of the input one-dimensional LUT 20 and the output one-dimensional LUT 24 are created based on the results of measurement, which measures the γ characteristics of the target device and the simulation device with respect to the four colors C, M, Y, and K when the results of printing by both the devices are measured with a spectral calorimeter. The contents of the gamut mapping circuit 28 are created based on the results of measurement, which measures the results of printing representing, for example, a gradation scale, for each color.

In the color conversion apparatus described above, data to be input into the matrix arithmetic operation circuits 26 and 30 are formed to polynomials, in order to enhance the precision of least squares approximation, by which the transformation matrices A and B used in the matrix arithmetic operation circuits 26 and 30 are calculated. When the three primary color component data C, M, and Y output from the C,M,Y fixed values output circuit 32 are written into the three-dimensional LUT 22 via the matrix arithmetic operation circuits 26 and 30, the colors of intermediate lightness having the enhanced precision of approximation are hardly affected by the transformation errors in the matrix arithmetic operation circuits 26 and 30. The precision of approximation is, however, not significantly improved for the colors of high lightness or low lightness. Such high-light or low-light colors may thus be significantly affected by the transformation errors and converted to different hues. The eyes of the man are rather insensitive to the colors of low lightness, but sensitive to the colors of high lightness. The change to different hues for the high-light colors is thus noticeable.

The type of paper used in the simulation device is often different from that used in the target device. Even when the contents of the three-dimensional LUT 22 are created to attain the color matching including the color of paper, since the very light color, such as the color of paper, is easily affected by the transformation errors, it is difficult to reproduce the color of paper used in the target device accurately on the paper used in the simulation device.

The method applied to solve this problem rewrites the contents of the three-dimensional LUT 22 in order to reproduce the color of paper more accurately by taking into account the effects due to the transformation errors. The color component data C, M, and Y representing the color of paper given to the simulation device is registered at an address specified by the combination of input color component data C, M, and Y representing white (that is, the combination of (C,M,Y)=(0,0,0)) in the three-dimensional LUT 22. The values of color-converted color component data C', M', and Y' registered at the address are thus to be changed to the values that can reproduce the color of paper accurately.

As discussed previously, the conversion of color component data is carried out by referring to the contents of the LUT and executing the interpolating arithmetic operations in the three-dimensional LUT 22. Rewriting the contents of the three-dimensional LUT 22 may accordingly deteriorate the quality of printing results. In accordance with a typical procedure, only a specific combination of color component data C, M, and Y representing the color of paper is replaced by another combination, and printing is carried out with a variation in only shade or gradation of a certain hue. In case that a certain color existing in the colors of varied gradation happens to be identical with an original color prior to the rewriting, the certain color is undesirably converted to a new color after the rewriting. This causes a color of different variation to appear in smooth gradation, which results in a distinct color skip.

In order to prevent such troubles, the contents of the three-dimensional LUT 22 should be rewritten not only for one combination but for a relatively wide range of combinations. This rewriting process is fundamentally based on the trial and error and thereby requires much time and skill of color evaluation.

SUMMARY OF THE INVENTION

The object of the present invention is thus to provide a method of changing the contents of a data conversion table, such as a three-dimensional LUT for color conversion, readily within a short time, without causing problems like color skip or skip of data values.

At least part of the object is realized by a method of changing a data conversion table that converts color component data of a first color system to converted color component data for at least one color component of a second color system, the method comprises the steps of: (a) changing first values of converted color component data for a specific combination of color component data of the first color system, thereby obtaining first changed values; and (b) changing second values of converted color component data for other combinations of color component data of the first color system other than the specific combination; and wherein the step (b) comprises the steps of: (1) determining differences between the first values and the first changed values; (2) determining non-subject combinations of color component data of the first color system for which values of converted color component data are not to be changed; (3) assuming an equation representing spatial distribution of differences to be used in the changing the second values for the other combinations in a color space of the first color system; and (4) solving the equation to determine the differences to be used in the changing the second values for the other combinations other than the specific combination, under conditions that the differences for the specific combination are equal to the differences determined at step (1) and that the differences for the non-subject combinations are equal to zero.

In the color space of the first color system, a specific point represents the specific combination. When the differences between the first value and the first changed value respect to the specific point is assumed to be a physical quantity, such as a potential, the effects of the differences are propagated to the circumference. The affected variations at the circumferential points (that is, other combinations) are accordingly determined by the equation specified as above.

The method of the present invention enables the contents of the data conversion table to be changed readily within a short time period. The contents of the data conversion table can be changed not only for one combination but for a relatively wide range of combinations. This effectively prevents an undesirable skip of data values.

In accordance with one preferable application, the first color system consists of three color components, and the specific combination is selected among eight combinations of color component data, said eight combinations comprising: one combination in which the values of three color components of the first color system are all equal to zero; one combination in which the values of three color components of the first color system are all equal to maximum values; three combinations in which the value of any one color component of the first color system is equal to zero and the values of the other two color components are equal to the maximum values; and three combinations in which the values of any two color components of the first color system are equal to zero and the value of the other one color component is equal to the maximum value.

It is preferable that the non-subject combinations include seven combinations among the eight combinations except the specific combination.

When color component data of the first color system are three primary color component data C, M, and Y, the eight combinations specified above substantially represent potential standard colors, that is, white, black, red, green, blue, cyan, magenta, and yellow. The specific combination are selected among these eight combinations since a change in values of converted color component data is highly demanded for such potential standard colors. The non-subject combinations include the residual seven combinations except the specific combination, since these seven colors not selected as the specific combination are potential standard colors and the values of converted color component data should not be unnecessarily changed for the standard colors.

In accordance with one preferable embodiment of the present invention, the non-subject combinations further include combinations of color component data represented by respective points on nine edges among twelve edges of a hexahedron in the color space, eight vertexes of the hexahedron representing the eight combinations of color component data, each of three edges of the hexahedron other than the nine edges starting from a specific vertex representing the specific combination.

It is preferable that the non-subject combinations further include combinations of color component data represented by respective points on first three faces among six faces of the hexahedron, each of second three faces of the hexahedron other than the first three faces comprising the tree edges starting from the specific vertex.

It is further preferable that the non-subject combinations further include combinations of color component data represented by respective points on at least one of three diagonals among four diagonals running through the hexahedron, one diagonal of the hexahedron other than the three diagonals starting from the specific vertex.

When one of the eight vertexes of the hexahedron (that is, one of the eight combinations representing the eight potential standard colors) is selected as the specific combination, the values of converted color component data are preferably reserved for the respective points on the edges, faces, and diagonals of the hexahedron excluding the vertex.

In the method of the present invention, the conditions in the step (4) further comprise a condition that, for combinations of color component data represented by respective points on the three edges starting from the specific vertex and on the one diagonal starting from the specific vertex, the differences decrease as a distance from the specific vertex to the respective points increases.

When color component data of the first color system are three primary color component data C, M, and Y and the specific combination is a combination representing white, for example, the three edges specified above respectively connect the two vertexes representing white and cyan with each other, those representing white and magenta, and those representing white and yellow, whereas one diagonal connects the two vertexes representing white and black with each other. The colors corresponding to the respective points on such edges and diagonal are colors between white and cyan, magenta, yellow, or black.

The specific vertex representing the specific combination (in the above example, the vertex representing white) should have the maximum variation of the value of converted data. The differences is equal to zero, on the other hand, for the vertexes of the three edges and one diagonal opposite to the specific vertex (in the above example, the vertexes representing cyan, magenta, yellow, and black). For the respective points on the three edges and one diagonal (in the above example, the points representing colors between white and cyan, magenta, yellow, or black), the differences of converted data is set to decrease with an increase in distance from the specific vertex (the vertex representing white). This enables the linearity of gradation to be maintained for the colors representing the respective points on the three edges and one diagonal.

In the method of the present invention, the non-subject combinations are selected among seven combinations among the eight combinations except the specific combination.

As discussed previously, when color component data of the first color system are three primary color component data C, M, and Y, the eight combinations specified above substantially represent potential standard colors. The non-subject combinations include the residual seven combinations except the specific combination, since the values of converted color component data should not be unnecessarily changed for the seven potential standard colors not selected as the specific combination.

In accordance with another preferable application of the present invention, the first color system consists of three color components, and the specific combination is combination of color component data represented by a specific point on one of twelve edges of a hexahedron in the color space, eight vertexes of the hexahedron representing eight combinations of color component data, the eight combinations including: one combination in which the values of three color components of the first color system are all equal to zero; one combination in which the values of three color components of the first color system are all equal to maximum values; three combinations in which the value of any one color component of the first color system is equal to zero and the values of the other two color components are equal to the maximum values; and three combinations in which the values of any two color components of the first color system are equal to zero and the value of the other one color component is equal to the maximum value.

It is desirable that the non-subject combinations include the eight combinations.

As discussed previously, when color component data of the first color system are three primary color component data C, M, and Y, the eight combinations substantially represent potential standard colors. A change in values of converted color component data is also highly demanded for the colors expressed as the respective points on the twelve edges of the hexahedron that connect the eight potential standard colors with one another. The non-subject combinations include these eight combinations, since the values of converted data should not be unnecessarily changed for these potential standard colors.

It is further preferable that the non-subject combinations further include combinations of color component data represented by respective points on eleven edges among the twelve edges of the hexahedron, one edge of the hexahedron other than the eleven edges including the specific point.

It is also preferable that the non-subject combinations further include combinations of color component data represented by respective points on four faces among six faces of the hexahedron, each of two faces of the hexahedron other than the four faces comprising the one edge including the specific point.

It is further preferable that the non-subject combinations further include combinations of color component data represented by respective points on at least one diagonal among four diagonals running through the hexahedron.

When one among the respective points on the twelve edges of the hexahedron is selected as the specific combination, the values of converted color component data are preferably reserved for the respective points on the edges and faces excluding the selected point and the respective points on a desired diagonal.

In the method of the present invention, the conditions in the step (4) further comprise a condition that, for combinations of color component data represented by respective points on the one edge including the specific point, the differences decrease as a distance from the specific point to the respective points increases.

When color component data of the first color system are three primary color component data C, M, and Y and the specific combination is a combination representing a specific color between cyan and green, for example, one edge including the specific point representing the specific combination connects the vertex representing cyan with the vertex representing green.

The specific point (in the above example, the point representing the specific color) should have the maximum differences. The differences is equal to zero, on the other hand, for the two vertexes on either ends of the edge (in the above example, the vertexes representing cyan and green). For the other points on the edge (in the above example, the points representing colors between the specific color and cyan or green), the differences is set to decrease with an increase in distance from the specific point representing the specific combination (the point representing the specific color). This enables the smoothness of gradation to be maintained for the colors expressed as the respective points on the edge (in the above example, the colors between cyan and green).

In accordance with still another preferable application of the present invention, the first color system consists of three color components, and the specific combination is combination of color component data represented by a specific point on one of four diagonals running through a hexahedron in the color space, eight vertexes of the hexahedron representing eight combinations of color component data, the eight combinations including: one combination in which the values of three color components of the first color system are all equal to zero; one combination in which the values of three color components of the first color system are all equal to maximum values; three combinations in which the value of any one color component of the first color system is equal to zero and the values of the other two color components are equal to the maximum values; and three combinations in which the values of any two color components of the first color system are equal to zero and the value of the other one color component is equal to the maximum value.

It is preferable that the non-subject combinations include the eight combinations.

As discussed previously, when color component data of the first color system are three primary color component data C, M, and Y, the eight combinations corresponding to the eight vertexes of the hexahedron substantially represent potential standard colors, that is, white, black, red, green, blue, cyan, magenta, and yellow. A change in values of converted color component data is also highly demanded for the colors expressed as the respective points on the four diagonals of the hexahedron that connect the eight potential standard colors with one another. The non-subject combinations include these eight combinations, since the values of converted data should not be unnecessarily changed for these potential standard colors.

It is also preferable that the non-subject combinations further include combinations of color component data represented by respective points on twelve edges of the hexahedron.

It is further preferable that the non-subject combinations further include combinations of color component data represented by respective points on six faces of the hexahedron.

When one among the respective points on the four diagonals of the hexahedron is selected as the specific combination, the values of converted color component data are preferably reserved for the respective points on the twelve edges and six faces of the hexahedron.

In the method of the present invention, the conditions in the step (4) further comprise a condition that, for combinations of color component data represented by respective points on one diagonal including the specific point, the differences decrease as a distance from the specific point to the respective points increases.

When color component data of the first color system are three primary color component data C, M, and Y and the specific combination is a combination representing a specific color between white and black, for example, one diagonal including the specific point representing the specific combination connects the vertex representing white with the vertex representing black.

The specific point (in the above example, the point representing the specific color) should have the maximum differences. The differences is equal to zero, on the other hand, for the two vertexes on either ends of the diagonal (in the above example, the vertexes representing white and black). For the other points on the diagonal (in the above example, the points representing colors between the specific color and white or black), the differences is set to decrease with an increase in distance from the specific point representing the specific combination (the point representing the specific color). This enables the linearity of gradation to be maintained for the colors expressed as the respective points on the diagonal (in the above example, the colors between white and black or achromatic colors).

In accordance with another preferable application of the present invention, the first color system consists of three color components, and the specific combination is combination of color component data represented by a specific point on one of six faces of a hexahedron in the color space, eight vertexes of the hexahedron representing eight combinations of color component data, the eight combinations including: one combination in which the values of three color components of the first color system are all equal to zero; one combination in which the values of three color components of the first color system are all equal to maximum values; three combinations in which the value of any one color component of the first color system is equal to zero and the values of the other two color components are equal to the maximum values; and three combinations in which the values of any two color components of the first color system are equal to zero and the value of the other one color component is equal to the maximum value.

It is preferable that the non-subject combinations include the eight combinations.

As discussed previously, when color component data of the first color system are three primary color component data C, M, and Y, the eight combinations substantially represent potential standard colors. A change in values of converted color component data is also highly demanded for the colors expressed as the respective points on the six faces of the hexahedron that connect the eight potential standard colors with one another. The non-subject combinations include these eight combinations, since the values of converted data should not be unnecessarily changed for these potential standard colors.

It is preferable that the non-subject combinations further include combinations of color component data represented by respective points on twelve edges of the hexahedron.

It is also preferable that the non-subject combinations further include combinations of color component data represented by respective points on five faces among the six faces of the hexahedron, one face of the hexahedron other than the five faces including the specific point.

It is further preferable that the non-subject combinations further include combinations of color component data represented by respective points on at least one diagonal among four diagonals running through the hexahedron.

When one among the respective points on the six faces of the hexahedron is selected as the specific combination, the values of converted color component data are preferably reserved for the respective points on the twelve edges of the hexahedron, the respective points on the faces excluding the selected point, and the respective points on a desired diagonal.

In accordance with still another preferable application of the present invention, the first color system consists of three color components, and the specific combination is combination of color component data represented by a specific point in a hexahedron in the color space, eight vertexes of the hexahedron representing eight combinations of color component data, the eight combinations including: one combination in which the values of three color components of the first color system are all equal to zero; one combination in which the values of three color components of the first color system are all equal to maximum values; three combinations in which the value of any one color component of the first color system is equal to zero and the values of the other two color components are equal to the maximum values; and three combinations in which the values of any two color components of the first color system are equal to zero and the value of the other one color component is equal to the maximum value.

It is preferable that the non-subject combinations include the eight combinations.

In some cases, it is desirable to change the value of converted color component data not only for the colors expressed as the points on the circumferential faces of the hexahedron but those expressed as the points in the hexahedron. The non-subject combinations include the eight combinations, since the values of converted data should not be unnecessarily changed for these potential standard colors.

It is preferable that the non-subject combinations further include combinations of color component data represented by respective points on twelve edges of the hexahedron.

It is also preferable that the non-subject combinations further include combinations of color component data represented by respective points on six faces of the hexahedron.

It is further preferable that the non-subject combinations further include combinations of color component data represented by respective points on at least one diagonal among four diagonals running through the hexahedron.

When one among the respective points in the hexahedron is selected as the specific combination, the values of converted color component data are preferably reserved for the respective points on the twelve edges and six faces of the hexahedron and the respective points on a desired diagonal.

In the method of the present invention, **36 In some cases, it is required to simultaneously change the values of converted color component data with respect to two or more combinations.

In accordance with one preferable embodiment, the data conversion table converts color component data of the first color system to converted color component data for at least three color components of the second color system, the steps (1) through steps (4) being carried out for each color of the second color system.

When the values of converted color component data for at least three color components of the second color system are to be changed, the processing should be carried out for the respective color components of the second color system since they are independent of one another.

It is preferable that the equation includes Laplace's Equation.

The Laplace's Equation is well known as a conditional equation representing a spatial variation in the field of physical quantity and is thus suitably used to determine the differences.

These and other objects, features, aspects, and advantages of the present invention will become more apparent from the following detailed description of the preferred embodiments with the accompanying drawings.

BRIEF DESCRIPTION OF THE DRAWINGS

FIG. 8 is a block diagram illustrating an essential part of a color conversion apparatus using a three-dimensional LUT for addition of variations;

DESCRIPTION OF THE PREFERRED EMBODIMENTS

Figure 1A:
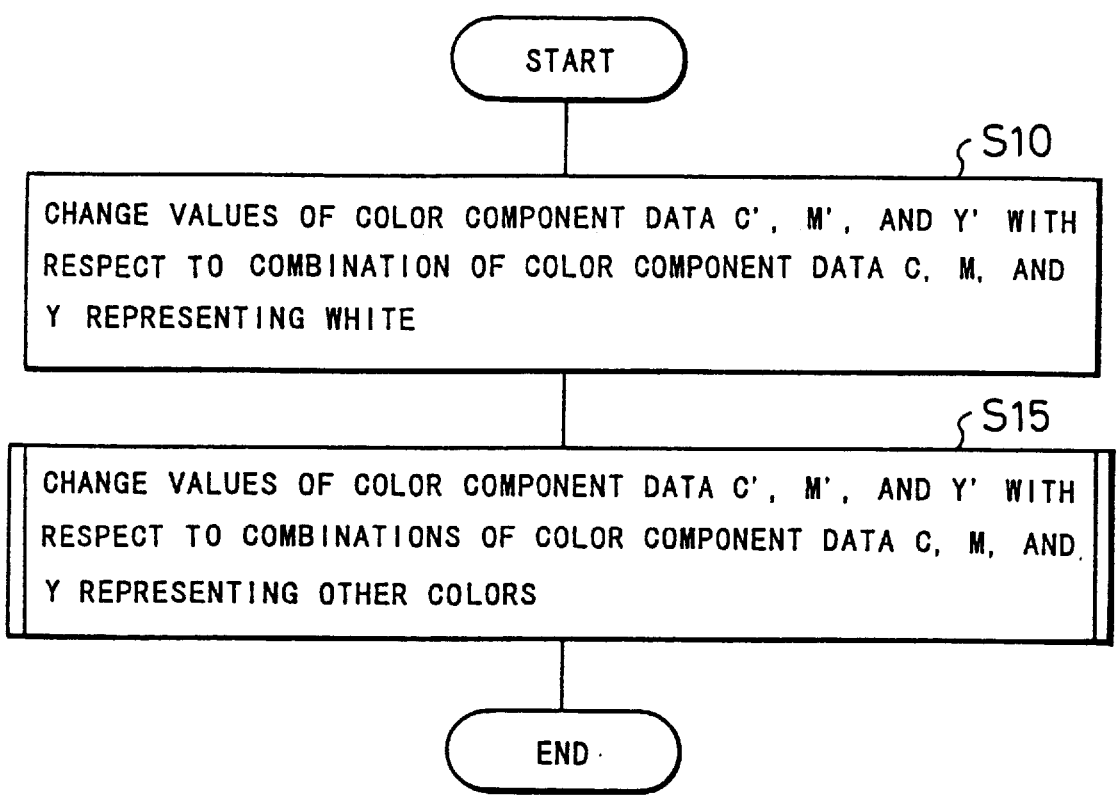
FIGS. 1A and 1B are flowcharts showing a processing routine for changing a three-dimensional LUT as a first embodiment according to the present invention.
Figure 1B:
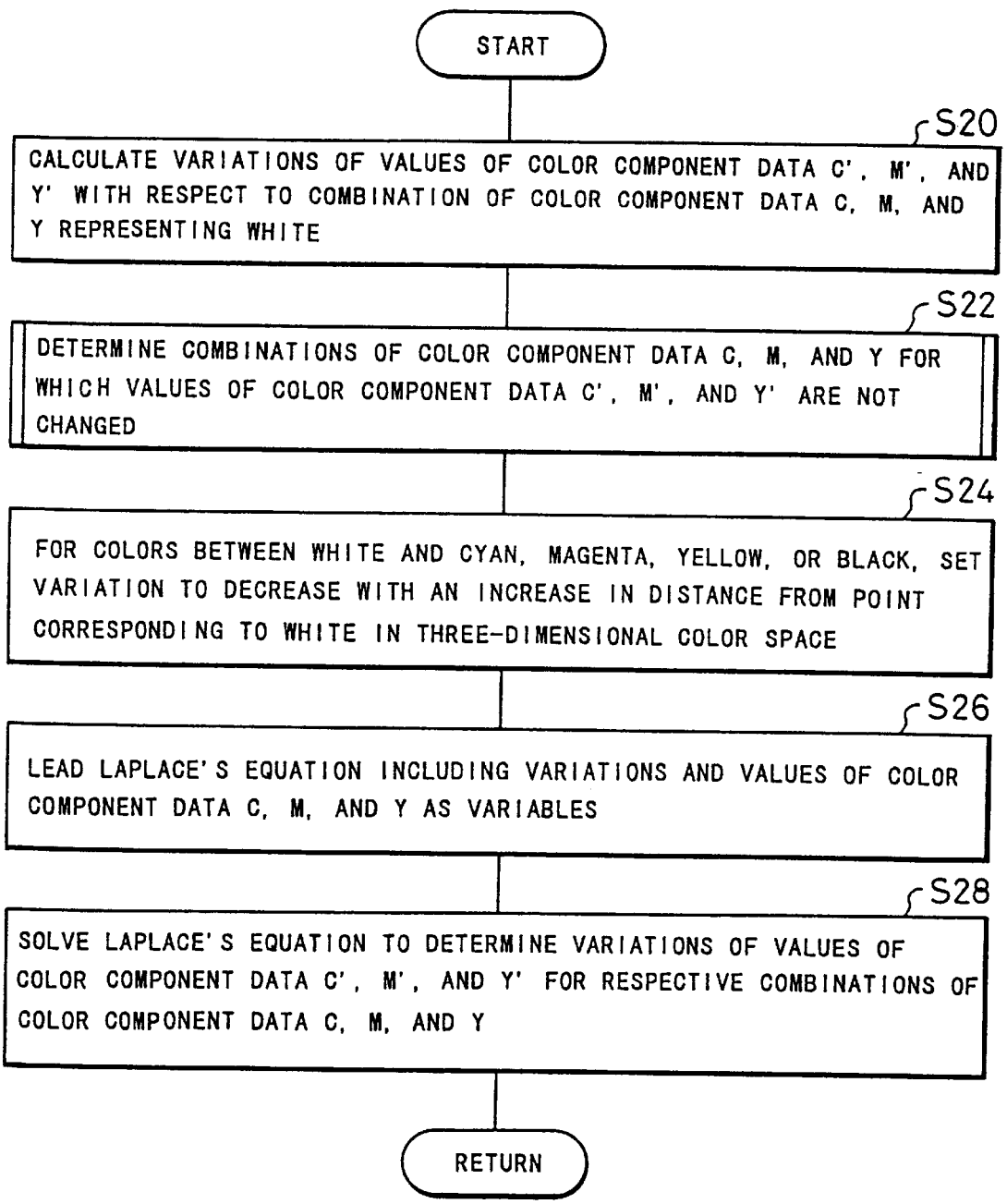

Some modes of carrying out the present invention are described below as preferred embodiments. FIGS. 1A and 1B are respectively flowcharts showing a processing routine for changing a three-dimensional LUT as a first embodiment according to the present invention.

Figure 24:
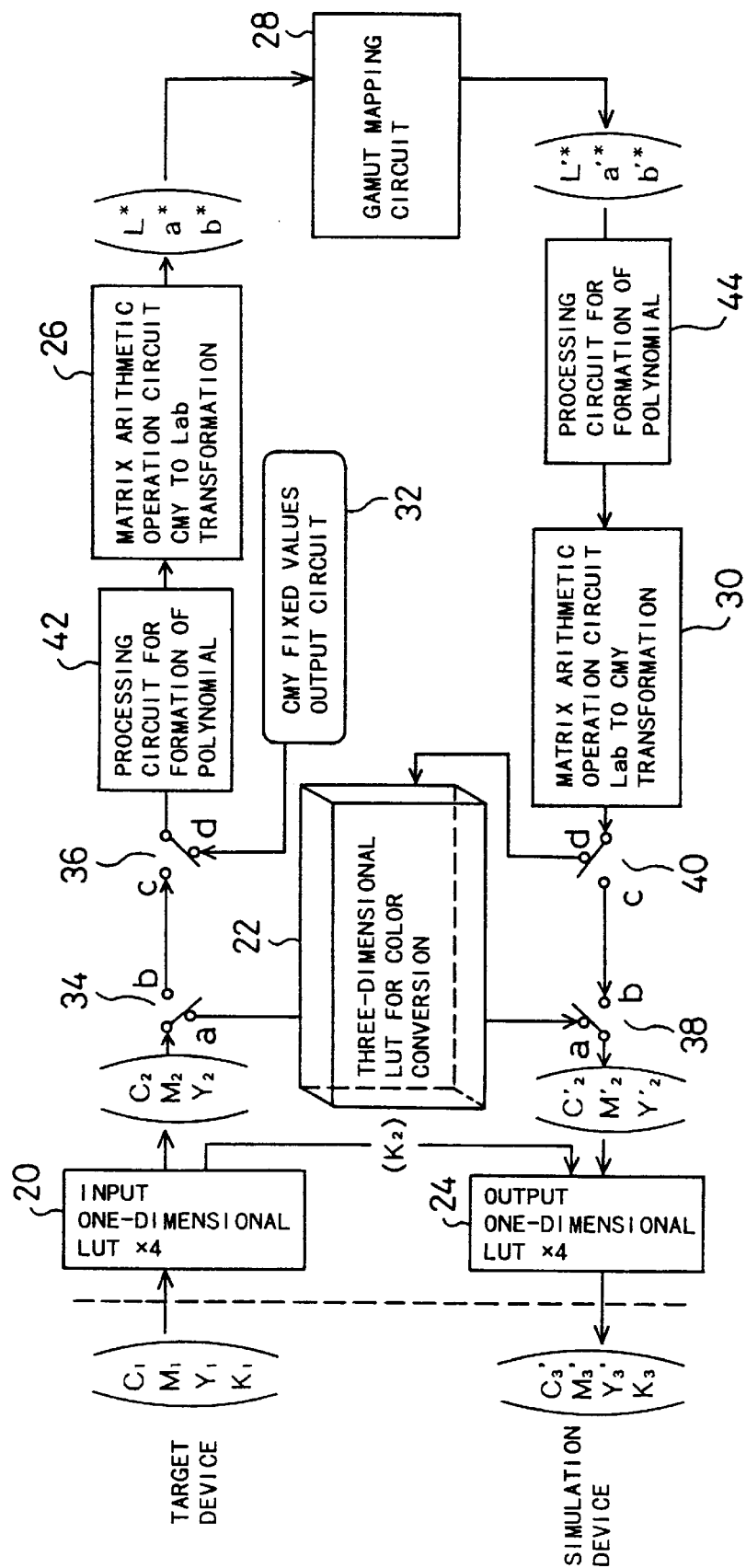
FIG. 24 is a block diagram illustrating a conventional color conversion apparatus with an LUT for color conversion.

The three-dimensional LUT of interest in this embodiment is a color conversion LUT like the three-dimensional LUT 22 shown in FIG. 24 and is used for changing data of three primary colors C, M, and Y to color converted data of three primary colors C, M, and Y. For distinction, the data of three primary colors C, M, and Y prior to being input into the three-dimensional LUT for color conversion are expressed as C, M, and Y, whereas the data of three primary colors C, M, and Y output from the three-dimensional LUT after the color conversion are expressed as C', M', and Y'.

By way of example, it is assumed that the contents of the three-dimensional LUT require rewriting in order to reproduce the color of paper more accurately. In accordance with a concrete procedure, as discussed previously, the color component data C, M, and Y representing the color of paper given to a simulation device are registered at an address in the three-dimensional LUT specified by a combination of color component data C, M, and Y representing white (combination of (C,M,Y)=(0,0,0)), which is hereinafter referred to as the address with respect to white. The values of color component data C', M', and Y' registered at the address with respect to white are changed to the values that represent the color of paper accurately. When C'=$c_i$, M'=$m_i$, and Y'=$y_i$ are registered as the values of color component data C', M', and Y' at the address with respect to white, for example, these values are changed to C'=$c_j$, M'=$m_j$, and Y'=$y_j$.

Referring to the flowchart of FIG. 1A, for the combination of color component data C, M, and Y representing white (combination of (C,M,Y)=(0,0,0)), the values of color component data C', M', and Y' are changed respectively from $c_i$, $m_i$, $y_i$ to $c_j$, $m_j$, $y_j$, at step 10.

The values of color component data C', M' and Y' are then changed with respect to combinations of color component data C, M and Y representing other colors at step S15. A detailed explanation of this changing process is given below by referring to FIG. 1B.

Referring to the flowchart of FIG. 1B, variations $U_0$, $V_0$, and $W_0$ of the values of color component data C', M', and Y' registered at the address with respect to white are calculated at step S20. The variations $U_0$, $V_0$, and $W_0$ of the values of color component data C', M', and Y' are obtained by arithmetic operations defined by Equations (3) given below:

$$U_o = c_j - c_i \quad (3)$$
$$V_o = m_j - m_i$$
$$W_o = y_j - y_i$$

Specifically, the variations are, as clearly understood from equation (3), the difference between the previous values of color component data C', M' and Y' and the changed values of color component data C', M' and Y'.

Addresses at which the values of color component data C', M', and Y' are not changed with a variation in values of color component data C', M', and Y' registered at the address with respect to white are selected among the available addresses in the three-dimensional LUT at step S22.

In this embodiment, when the values of color component data C', M', and Y' are changed for the combination of color component data C, M, and Y representing white (combination of (C,M,Y)=(0,0,0)), the values of color component data C', M', and Y' are not changed but fixed for the respective combinations of color component data C, M, and Y representing cyan, magenta, and yellow (these are three primary colors in the subtractive mixture of color stimuli), red, green, and blue (these are three primary colors in the additive mixture of color stimuli), and black. For the respective combinations of color component data C, M, and Y representing these seven colors, variations (U,V,W) of the values of color component data C', M', and Y' are accordingly equal to (0,0,0).

At step S22, addresses specified by the respective combinations of color component data C, M, and Y representing these seven colors are selected among the available addresses in the three-dimensional LUT as the addresses at which the values of color component data C', M', and Y' are not changed.

When the maximum values of the data of three primary colors C, M, and Y are respectively expressed as C=$c_{max}$, M=$m_{max}$, and Y=$y_{max}$, the combinations of color component data C, M, and Y representing cyan, magenta, yellow, red, green blue, and black are specified as Equations (4) given below:

$$\text{Cyan: } (C,M,Y) = (c_{max},0,0) \qquad (4)$$

$$\text{Magenta: } (C,M,Y) = (0,m_{max},0)$$

$$\text{Yellow: } (C,M,Y) = (0,0,y_{max})$$

$$\text{Red: } (C,M,Y) = (0,m_{max},y_{max})$$

$$\text{Green: } (C,M,Y) = (c_{max},0,y_{max})$$

$$\text{Blue: } (C,M,Y) = (c_{max},m_{max},0)$$

$$\text{Black: } (C,M,Y) = (c_{max},m_{max},y_{max})$$

Figure 2:
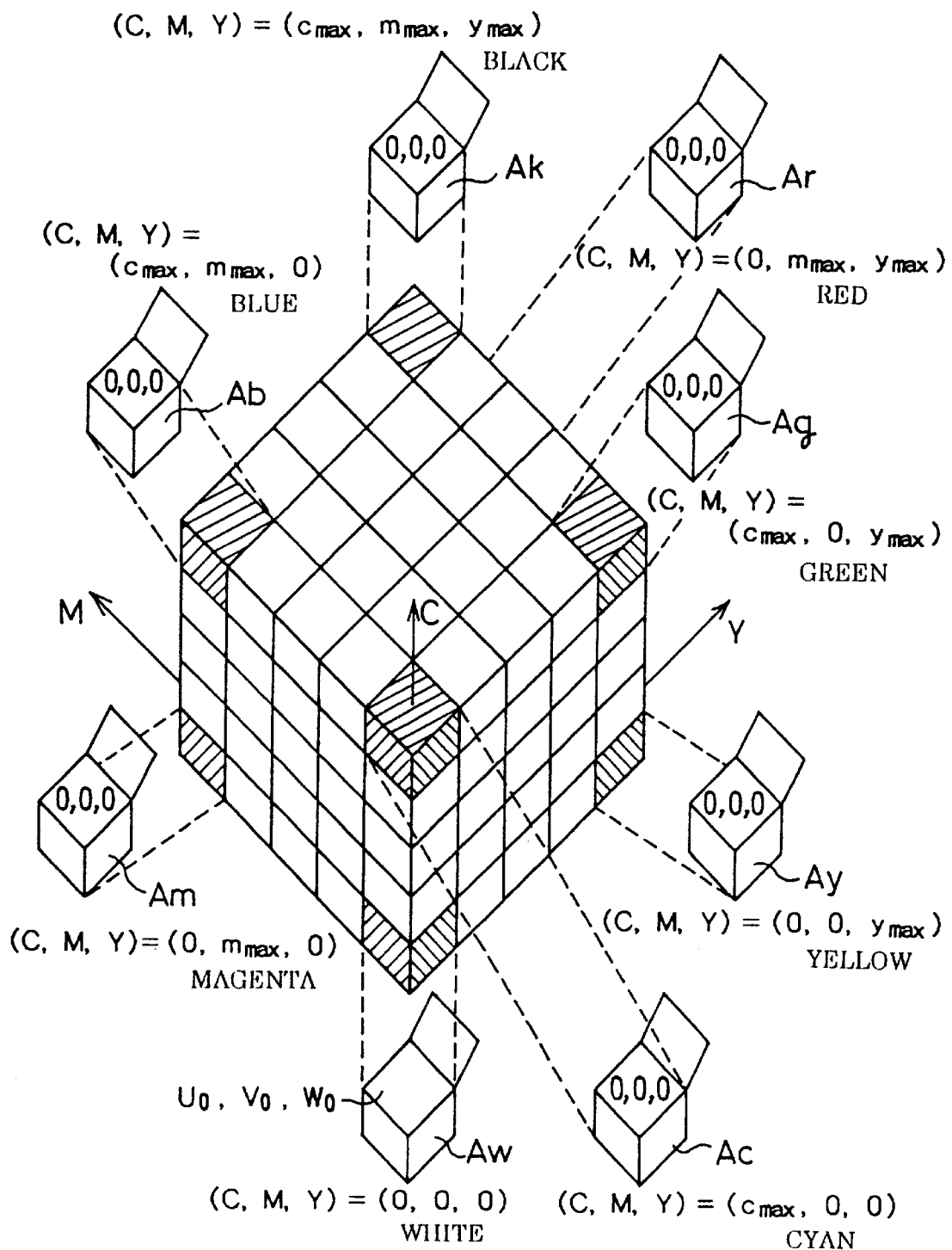
FIG. 2 is a perspective view schematically illustrating a three-dimensional LUT, wherein variations U, V, and W of the values of color component data C', M', and Y' are registered at addresses specified by combinations of the values of color component data C, M, and Y.

It is assumed that the variations U, V, and W of the values of color component data C', M', and Y' are registered at addresses of a three-dimensional LUT specified by the respective combinations of the values of three primary color component data C, M, and Y. FIG. 2 is a perspective view schematically illustrating such a three-dimensional LUT. Referring to FIG. 2, $U_0$, $V_0$, and $W_0$ obtained at step S20 are registered as the variations U, V, and W of the values of color component data C', M', and Y' at an address Aw with respect to white. At addresses Ac, Am, Ay, Ar, Ab, Ag, and Ak selected at step S22 (that is, addresses with respect to cyan, magenta, yellow, red, green, blue, and black), on the other hand, (0,0,0) are registered as the variations U, V, and W of the values of color component data C', M', and Y'.

Whereas $(U_0,V_0,W_0)$ are set as the variations U, V, and W of the values of color component data C', M', and Y' with respect to white, (0,0,0) are set as the variations U, V, and W of the values of color component data C', M', and Y' with respect to the seven colors, cyan, magenta, yellow, red, green, blue, and black.

At step S22 in the flowchart of FIG. 1B, combinations of color component data C, M, and Y for which the values of color component data C', M', and Y' are not changed are then determined with respect to the colors other than these seven colors. In other words, combinations of color component data C, M, and Y for which (0,0,0) are set as the variations U. V, and W of the values of color component data C', M', and Y' are determined.

Figure 3:
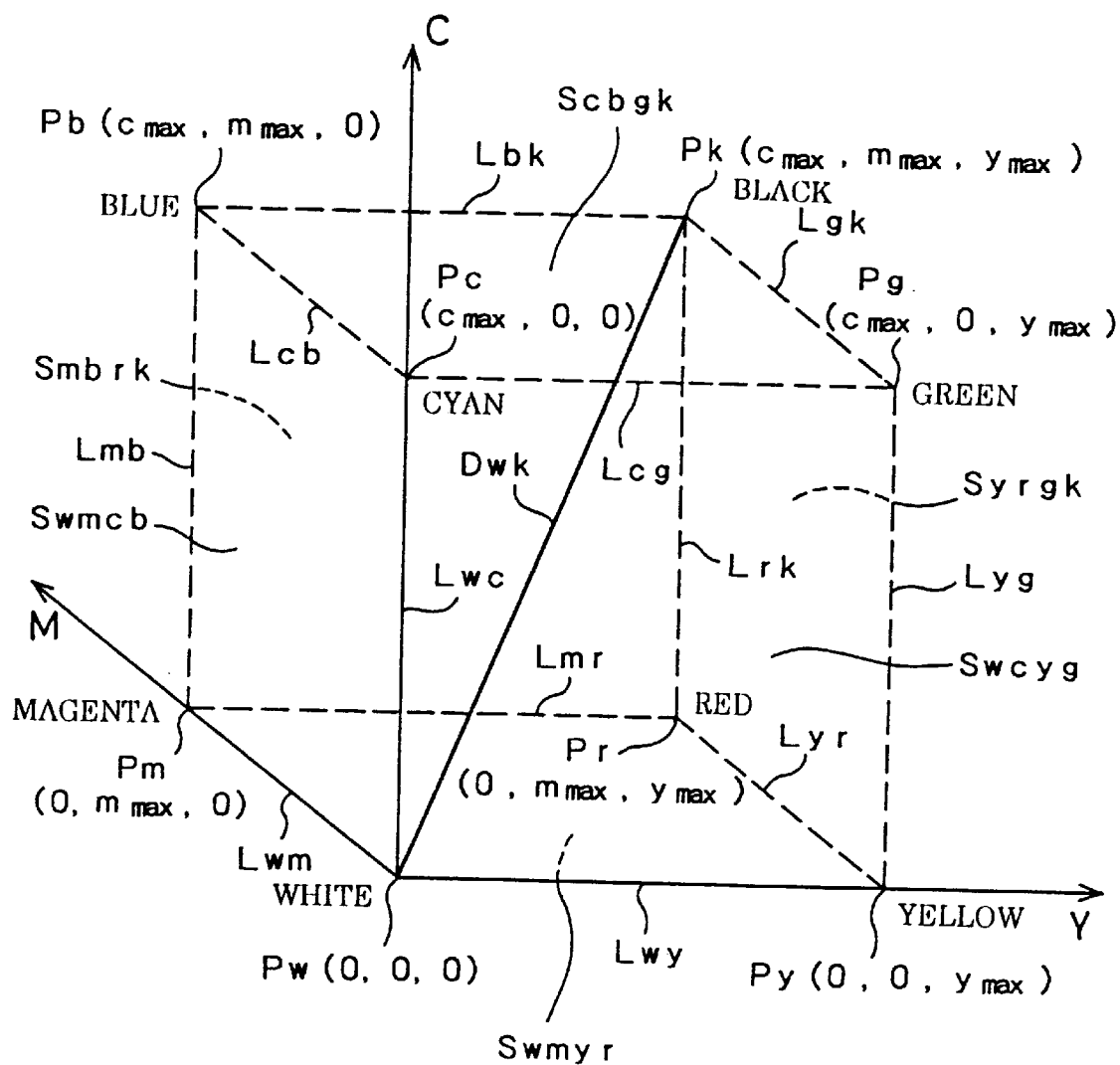
FIG. 3 is a perspective view schematically illustrating a three-dimensional color space having color component data C, M, and Y respectively set as rectangular coordinate axes.

FIG. 3 is a perspective view schematically illustrating a three-dimensional color space of the three primary color component data C, M, and Y respectively set as rectangular coordinate axes.

As discussed previously, the combination of color component data C, M, and Y representing white is defined as (C,M,Y)=(0,0,0), whereas the combinations of color component data C, M, and Y representing cyan, magenta, yellow, red, green, blue, and black are specified as Equations (4) given above. The combinations of color component data C, M, and Y representing these eight colors are plotted in the three-dimensional color space of the color component data C, M, and Y respectively set as the rectangular coordinate axes. The plots are eight points Pw, Pc, Pm, Py, Pr, Pg, Pb, and Pk in the drawing of FIG. 3. When these eight points are joined with one another, a rectangular parallelopiped consisting of the color component data C, M, and Y is generated in the three-dimensional color space. The eight points Pw, Pc, Pm, Py, Pr, Pg, Pb, and Pk corresponding to the eight colors respectively denote vertexes of the rectangular parallelopiped.

Referring back to the flowchart of FIG. 1B, at step S22, it is determined not to change the values of color component data C', M', and Y' that is, to set (0,0,0) as the variations U, V, and W of the values of color component data C', M', and Y', for the colors corresponding to the respective points on the remaining nine edges Lcb, Lcg, Lmb, Lmr, Lyg, Lyr, Lrk, Lgk, and Lbk shown by the broken lines, which are edges of the rectangular parallelopiped shown in FIG. 3 except three edges Lwc, Lwm, and Lwy that connect the vertex Pw corresponding to white with the three vertexes Pc, Pm, and Py corresponding to cyan, magenta, and yellow and are shown by the solid lines.

At step S22 in the flowchart of FIG. 1B, it is further determined not to change the values of color component data C', M', and Y', that is, to set (0,0,0) as the variations U, V, and W of the values of color component data C', M', and Y', for the colors corresponding to the respective points on the remaining three faces Syrgk, Smbrk, and Scbgk, which are faces of the rectangular parallelopiped shown in FIG. 3 except three faces Swcyg, Swmcb, and Swmyr including the three edges Lwc, Lwm, and Lwy shown by the solid lines.

Figure 4:
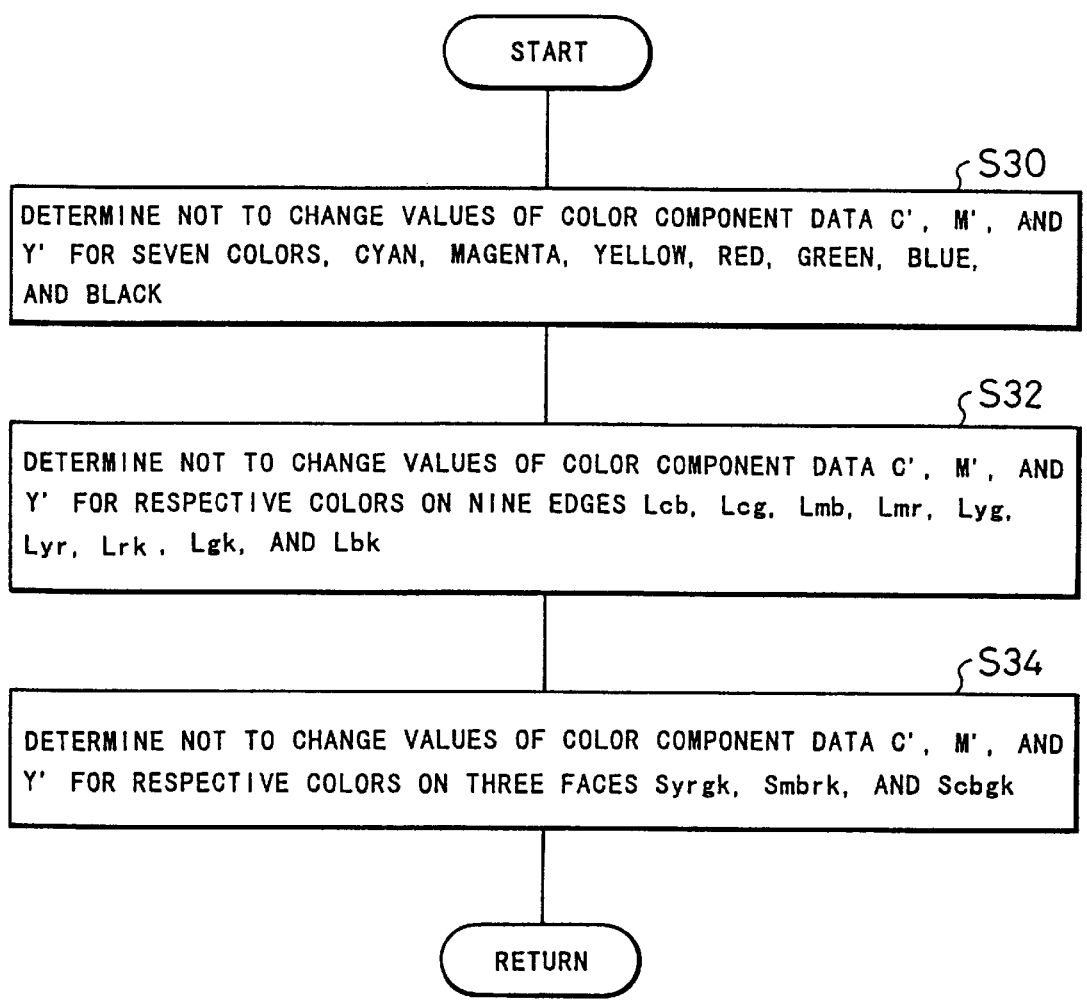
FIG. 4 is a flowchart showing details of the processing executed at step S22 in the flowchart of FIG. 1B.

The flowchart of FIG. 4 shows details of the processing executed at step S22 in the flowchart of FIG. 1B. Referring to FIG. 4, the variations U, V, and W of the values of color component data C', M', and Y' are set equal to (0,0,0) for the seven colors, cyan, magenta, yellow, red, green, blue, and black at step S30, for the colors corresponding to the respective points on the nine edges of the rectangular parallelopiped shown in FIG. 3 at step S32, and for the colors corresponding to the respective points on the three faces at step S34.

The variations U, V, and W of the values of color component data C', M', and Y' are then determined for the colors other than those specified above. Since the variations U, V, and W are determined in an identical manner, the following describes a process of determining the variation U of the value of color component data C' as a typical example.

Referring back to the flowchart of FIG. 1B, at step S24, for the colors corresponding to the respective points on the three edges Lwc, Lwm, and Lwy that are among the edges of the rectangular parallelopiped shown in FIG. 3 and connect the vertex Pw corresponding to white with the three vertexes Pc, Pm, and Py corresponding to cyan, magenta, and yellow, the variation U of the value of color component data C' is set to decrease with an increase in distance from the vertex Pw corresponding to white to the respective points on the three edges. In a similar manner, for the colors corresponding to the respective points on one diagonal Dwk that is among the diagonals of the rectangular parallelopiped and connects the vertex Pw corresponding to white with the vertex Pk corresponding to black, the variation U of the value of color component data C' is set to decrease with an increase in distance from the vertex Pw corresponding to white to the respective points on the diagonal. The values of color component data C, M, and Y are discrete values, so that the points on the edges Lwc, Lwm, and Lwy and the diagonal Dwk are discrete points.

Figure 5:
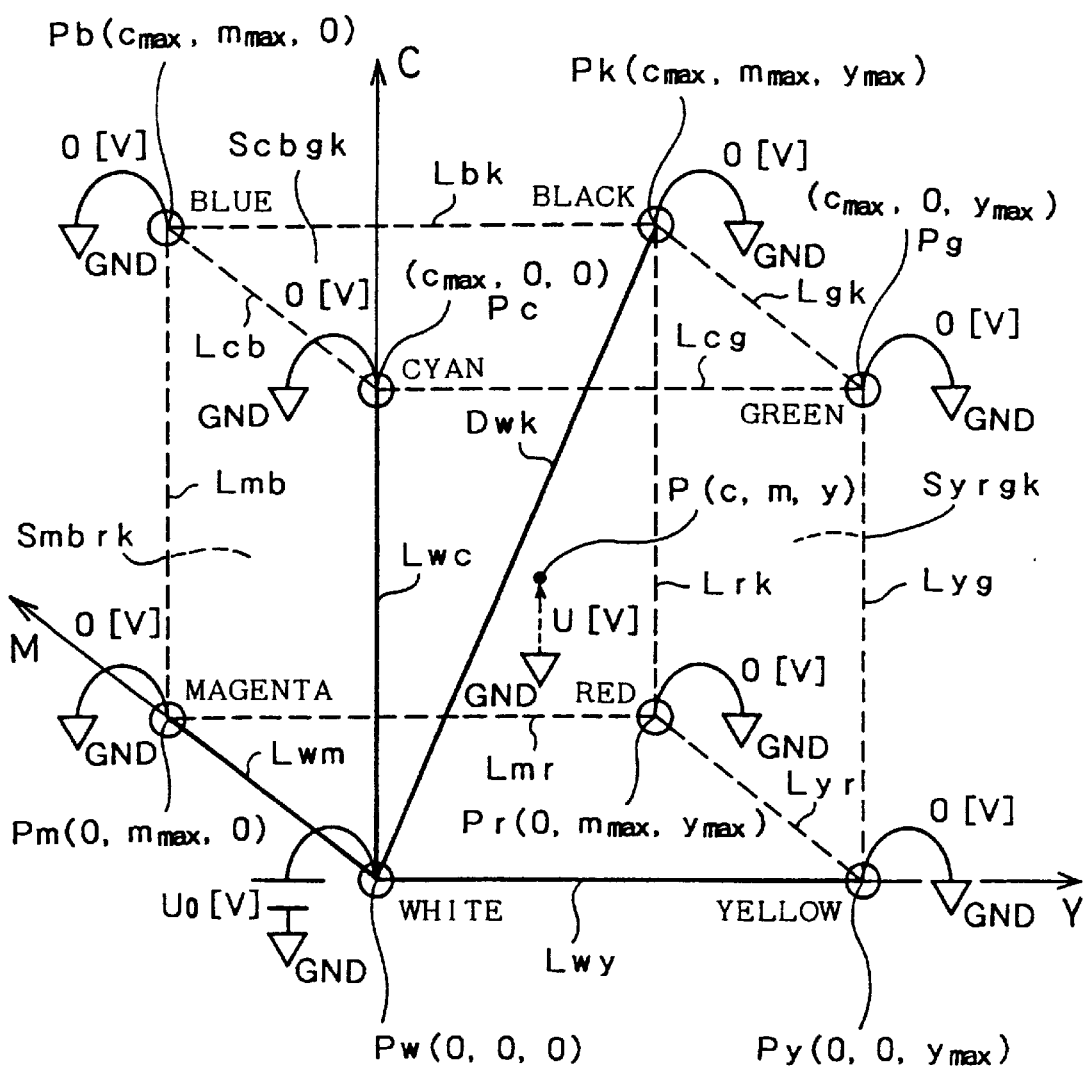
FIG. 5 shows replacement of the three-dimensional color space with the rectangular parallelopiped of FIG. 3 formed therein by a three-dimensional electrostatic field.
Figure 6:
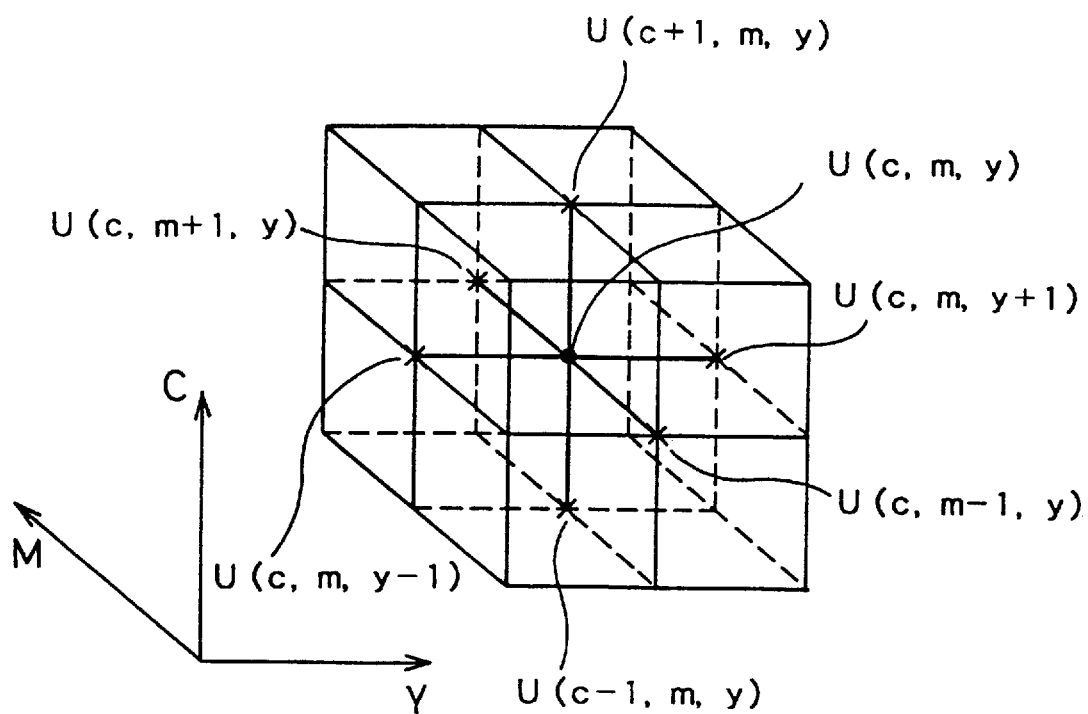
FIG. 6 is a perspective view illustrating an arbitrary lattice point and six adjoining lattice points.

The three-dimensional color space in which the rectangular parallelopiped specified above is generated is replaced by a three-dimensional electrostatic field. FIG. 5 illustrates a replacement of the three-dimensional color space with the rectangular parallelopiped of FIG. 3 by a three-dimensional electrostatic field.

It is assumed that potentials equivalent to the variations U are given to predetermined points in the rectangular parallelopiped. As shown in FIG. 5, the variation U of the value of color component data C' is equal to $U_0$ for white, so that a potential of $U_0[V]$ is given to the vertex Pw corresponding to white. The variation U of the value of color component data C' is equal to zero for all the seven colors, cyan, magenta, yellow, red, green, blue, and black, so that a potential of 0[V] is given to the respective vertexes Pc, Pm, Py, Pr, Pg, Pb, and Pk corresponding to these seven colors.

In the rectangular parallelopiped shown in FIG. 5, the potential of 0[V] is also given to the respective points on the nine edges Lcb, Lcg, Lmb, Lmr, Lyg, Lyr, Lrk, Lgk, and Lbk and those on the three faces Syrgk, Smbrk, and Scbgk.

The three other edges Lwc, Lwm, and Lwy and one diagonal Dwk of the rectangular parallelopiped are constructed as resistors having a distribution of uniform resistance along the direction of each line.

The potential is equal to $U_0[V]$ at the vertex Pw corresponding to white, and equal to 0[V] at the vertexes Pc, Pm, Py, and Pk corresponding to cyan, magenta, yellow, and black. The respective points on the edges Lwc, Lwm, and Lwy and the diagonal Dwk accordingly have potentials ranging between $U_0[V]$ and 0[V], which gradually decrease in an increase in distance from the vertex Pw corresponding to white. Namely the potentials at the respective points on the edges Lwc, Lwm, and Lwy and the diagonal Dwk represent the variations U of the values of color component data C' for the colors corresponding to these points.

The above procedure sets the variation U of the value of color component data C' for the eight colors representing the eight vertexes of the rectangular parallelopiped and the colors corresponding to the respective points on the twelve edges, one diagonal, and three faces. The variation U of the value of color component data C' is then determined for the other colors as discussed below.

Referring back to the flowchart of FIG. 1B, at step S26, a three-dimensional Laplace's Equation defined as Equation (5) given below is introduced. This Equation is used for determining the variation U of the value of color component data C' for the color corresponding to an arbitrary point P in the rectangular parallelopiped shown in FIG. 5, other than the eight vertexes Pw, Pc, Pm, Py, Pr, Pg, Pb, Pk and the respective points on the twelve edges Lwc, Lwm, Lwy, Lcb, Lcg, Lmb, Lmr, Lyg, Lyr, Lrk, Lgk, Lbk, one diagonal Dwk, and three faces Syrgk, Smbrk, and Scbgk. Since the values of color component data C, M, and Y are discrete values, the arbitrary point P forms a lattice point.

$$\frac{\partial^2 U}{\partial C^2} + \frac{\partial^2 U}{\partial M^2} + \frac{\partial^2 U}{\partial Y^2} = 0 \quad (5)$$

In case that the three-dimensional color space with the rectangular parallelopiped formed therein is replaced by the three-dimensional electrostatic field as discussed above, the potential U[V] of the lattice point P satisfies the Laplace's Equation defined as Equation (5) as shown in FIG. 5. When the potential U[V] of the lattice point P represents the variation U of the value of color component data C' for the color corresponding to the lattice point P, the variation U is determined by solving the Laplace's Equation defined as Equation (5) at step S28 in the flowchart of FIG. 1B.

The Laplace's Equation defined as Equation (5) is solved in the following manner. It is assumed that the variations with respect to six lattice points adjoining to the lattice point P and shown by the crosses are respectively set as U(c+1,m,y), U(c-1,m,y), U(c,m+1,y), U(c,m-1,y), U(c,m,y+1), and U(c,m,y-1). The variation U(c,m,y) with respect to the lattice point P is obtained as the numerical solution of a difference equation, that is, Equation (6) given below:

$$U(c,m,y) = \frac{1}{6} \{U(c+1,m,y) + U(c-1,m,y) + U(c,m+1,y) + \quad (6)$$

-continued $$U(c,m-1,y) + U(c,m,y+1) + U(c,m,y-1)\}$$

Similar equations are set up for all the lattice points in the rectangular parallelopiped. This gives simultaneous equations corresponding to the number of lattice points in the rectangular parallelopiped. Solution of the simultaneous equations results in solving the Laplace's Equation defined as Equation (5). In other words, solution of the simultaneous equations determines the variation U for the lattice point P as well as a plurality of other lattice points. The variation U has already been determined for the eight vertexes Pw, Pc, Pm, Py, Pr, Pg, Pb, Pk and the respective points on the twelve edges Lwc, Lwm, Lwy, Lcb, Lcg, Lmb, Lmr, Lyg, Lyr, Lrk, Lgk, Lbk, one diagonal Dwk, and three faces Syrgk, Smbrk, and Scbgk. The variations U for such points can be substituted as known values in the process of solving the simultaneous equations.

In this manner, the variation U of the value of color component data C' can be obtained for the colors other than the eight colors representing the eight vertexes of the rectangular parallelopiped and the colors corresponding to the respective points on the twelve edges, one diagonal, and three faces, by assuming the three-dimensional color space of the color component data C, M, and Y set as rectangular coordinate axes and replacing the three-dimensional color space by the three-dimensional electrostatic field.

The above discussion regards the process of determining the variation U of the value of color component data C'. The variations V and W of the values of color component data M' and Y' can be obtained in the same manner as above.

The procedure discussed above determines the variations U, V, and W of the values of color component data C', M' and Y' for the colors corresponding to the respective points in the rectangular parallelopiped, that is, for the respective combinations of the values of three primary color component data C, M, and Y.

The variations U, V, and W thus obtained are expressed as three-dimensional vectors starting from the corresponding points in the rectangular parallelopiped. The terminal points of such three-dimensional vectors are given as shown in FIG. 7.

Figure 7:
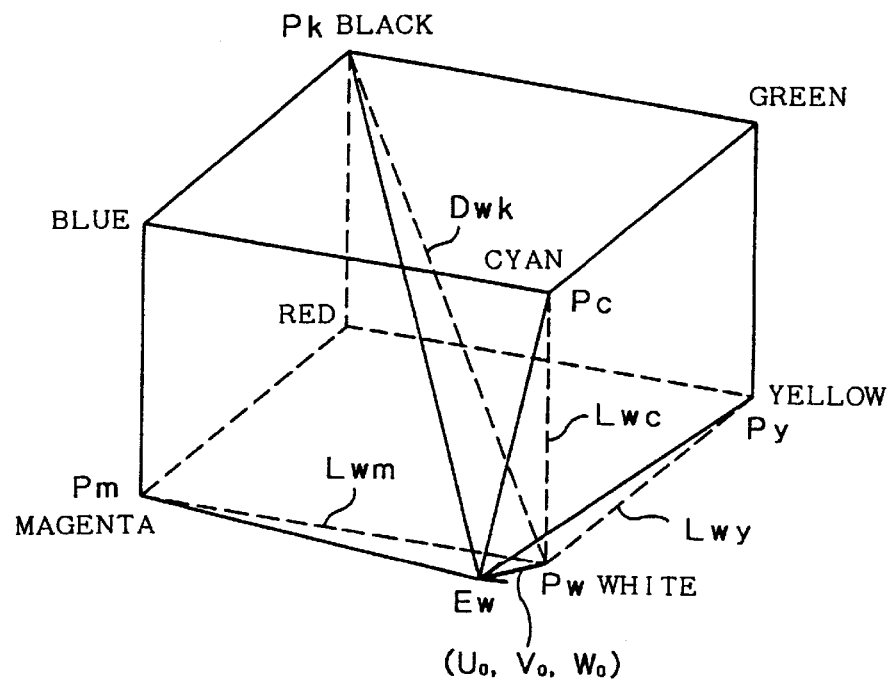
FIG. 7 shows the results of the processing in the first embodiment, wherein the variations U, V, and W of the values of color component data C', M', and Y' are expressed as three-dimensional vectors starting from the corresponding points of the rectangular parallelopiped and terminal points of the three-dimensional vectors are plotted.

The variations U, V, and W of the values of color component data C', M', and Y' with respect to white are equal to $U_0$, $V_0$, and $W_0$ as discussed previously, and are thus given as a three-dimensional vector $(U_0,V_0,W_0)$ starting from the vertex Pw of the rectangular parallelopiped representing white as shown in FIG. 7. A terminal point of this three-dimensional vector is set as Ew. For the colors corresponding to the respective points on the edges Lwc, Lwm, and Lwy and the diagonal Dwk, the variations U, V, and W are set to decrease with an increase in distance from the vertex Pw corresponding to white to each point on such lines. Terminal points of three-dimensional vectors starting from the respective points on such lines accordingly form plane curves Ew-Pc, Ew-Pm, Ew-Py, and Ew-Pk as shown in FIG. 7.

A three-dimensional LUT for addition of variations is prepared by storing the variations U, V, and W of the values of color component data C', M', and Y' thus obtained at addresses specified by the combinations of the values of three primary color component data C, M, and Y as shown in FIG. 2. The three-dimensional LUT has color component data C, M, and Y as inputs and variations U, V, and W of the values of color component data C', M', and Y' corresponding to the combinations of color component data C, M, and Y as outputs.

FIG. 8 is a block diagram illustrating an essential part of a color conversion apparatus using the three-dimensional LUT for addition of variations thus prepared. Only an LUT element with an LUT for color conversion is shown in the drawing of FIG. 8, whereas an LUT generating element for creating the contents of the LUT for color conversion is omitted from the drawing. The LUT element primarily includes an input one-dimensional LUT 120 for canceling γ correction made on every color component data, cyan (C), magenta (M), yellow (Y), and black (K), a three-dimensional LUT 122 for color conversion, a three-dimensional LUT 150 for addition of variations, and a three-dimensional LUT changing circuit 154. The LUT element further includes an adder circuit 152 for summing up the color component data C', M', and Y' output from the three-dimensional LUT 122 for color conversion and the variations U, V, and W output from the three-dimensional LUT 150 for addition of variations, and an output one-dimensional LUT 124 for making y correction on every output color component data C, M, Y. and K.

Referring to FIG. 8, the three-dimensional LUT changing circuit 154 prepares the contents of the three-dimensional LUT 150 for addition of variations as discussed above according to the method of variation of the embodiment, in order to substantially change the contents of the three-dimensional LUT 122 for color conversion. After preparing the contents of the three-dimensional LUT 150, the three-dimensional LUT changing circuit 154 stops its operation until it receives another instruction to change the contents.

In accordance with a normal procedure, the input one-dimensional LUT 120 receives the color component data C, M, Y, and K, which are to be input into a target device, and cancels γ correction made on every color component data C, M, Y, and K. After the cancellation, the color component data C, M, and Y are input into the three-dimensional LUT 122 for color conversion and the three-dimensional LUT 150 for addition of variations, while the color component data K skips the three-dimensional LUT 122 for color conversion and is input into the output one-dimensional LUT 124.

Like the output from the three-dimensional LUT 22 shown in FIG. 24, a combination of the values of color-converted color component data C', M', and Y' is read from an address specified by the combination of the values of input color component data C, M, and Y and output from the three-dimensional LUT 122 for color conversion. The variations U, V, and W of the values of color component data C', M', and Y' obtained in the above manner are also read from an address specified by the combination of the values of input color component data C, M, and Y and output from the three-dimensional LUT 150 for addition of variations. Since the identical address is specified in both the three-dimensional LUTs 122 and 150, the variations U, V, and W output from the three-dimensional LUT 150 for addition of variations represent variations of the values of color component data C', M', and Y' output from the three-dimensional LUT 122 for color conversion.

The adder circuit 152 sums up the values of color component data C', M', and Y' output from the three-dimensional LUT 122 for color conversion and the variations U, V, and W output from the three-dimensional LUT 150 for addition of variations. This adding procedure enables a desirable change to be given to the values of color component data C', M', and Y' output from the three-dimensional LUT 122 for color conversion. With a change in values of color component data C', M', and Y' from $c_i$, $m_i$, $Y_i$ to $c_j$, $m_j$, and $y_j$ with respect to the combination of color component data C, M, and Y representing white (that is, the combination of (C,M, Y)=(0,0,0)), the values of color component data C', M', and Y' with respect to the combinations of color component data C, M, and Y representing other colors can be changed in order to prevent an undesirable color skip.

The structure of the embodiment determines the variations by solving the Laplace's Equation defined as Equation (5), thereby allowing the contents of the three-dimensional LUT to be varied readily within a short time. The contents of the three-dimensional LUT can be changed not only for one combination of the values of color component data C', M', and Y' but for a relatively wide range of combinations. This effectively prevents an undesirable color skip.

In the above embodiment, at step S24 in the flowchart of FIG. 1B, for the colors corresponding to the respective points on the three edges Lwc, Lwm, and Lwy that are among the edges of the rectangular parallelopiped and for the colors corresponding to the respective points on one diagonal Dwk that is among the diagonals of the rectangular parallelopiped, the variations U, V, and W of the values of color component data C', M', and Y' are set to decrease with an increase in distance from the vertex Pw corresponding to white to the respective points on the three edges or the diagonal. The processing of step S24 may, however, be omitted when it is desirable to maintain the tone gradation before the change.

Figure 9:
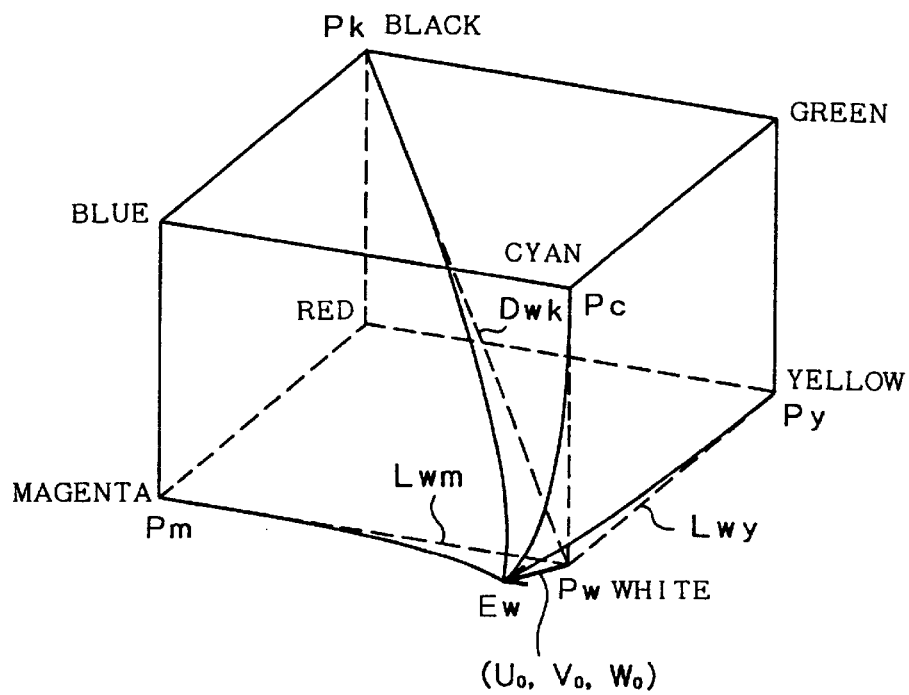
FIG. 9 shows the results without the processing of step S24 of FIG. 1B, wherein the variations U, V, and W of the values of color component data C', M', and Y' are expressed as three-dimensional vectors starting from the corresponding points of the rectangular parallelopiped and terminal points of the three-dimensional vectors are plotted.

FIG. 9 shows the results without the processing of step S24 of FIG. 1B, wherein the variations U, V, and W of the values of color component data C', M', and Y' are expressed as three-dimensional vectors starting from the corresponding points of the rectangular parallelopiped and terminal points of the three-dimensional vectors are plotted.

As mentioned previously, the variations U, V, W with respect to white are expressed as a three-dimensional vector $(U_0,V_0,W_0)$ starting from the vertex Pw of the rectangular parallelopiped as shown in FIG. 9. In case that the processing of step S24 is omitted from the flowchart of FIG. 1B, the variations U, V, W of the values of color component data C', M', and Y' are led from the Laplace's Equation at step S28 for the colors corresponding to the respective points on the edges Lwc, Lwm, Lwy and diagonal Dwk. When the terminal point of this three-dimensional vector is set as Ew, the terminal points of three-dimensional vectors starting from the respective points on the edges Lwc, Lwm, and Lwy and the diagonal Dwk form curves Ew-Pc, Ew-Pm, Ew-Py, and Ew-Pk as shown in FIG. 9.

As clearly seen from FIG. 9, in case that the processing of step S24 is omitted, the variations of the values of color component data C', M', and Y' are not significant for the colors close to cyan, magenta, and yellow, but are rather significant for the colors close to white.

The primary difference between the procedures with and without the processing of step S24 is as follows. The procedure with the processing of step S24 enables the linearity of gradation to be reserved for the primary colors (colors between white and cyan, magenta, or yellow) as shown in FIG. 7. The procedure without the processing of step S24, on the other hand, enables the color development to be reserved in areas of high saturation (that is, areas close to cyan, magenta, and yellow) as shown in FIG. 9.

In order to reproduce the color of paper properly, the procedure of the first embodiment discussed above first varies the values of color component data C', M', and Y' for white and then changes the same for other colors accompanied by the variation regarding white. The principle of the present invention is, however, applicable to the process of varying the values of color component data C', M', and Y' for any specific color other than white and then changing the same for other colors accompanied by the variation regarding the specific color. The following describes various processes of determining the variations U, V, W of the values of color component data C', M', and Y' as other embodiments according to the present invention.

Figure 10:
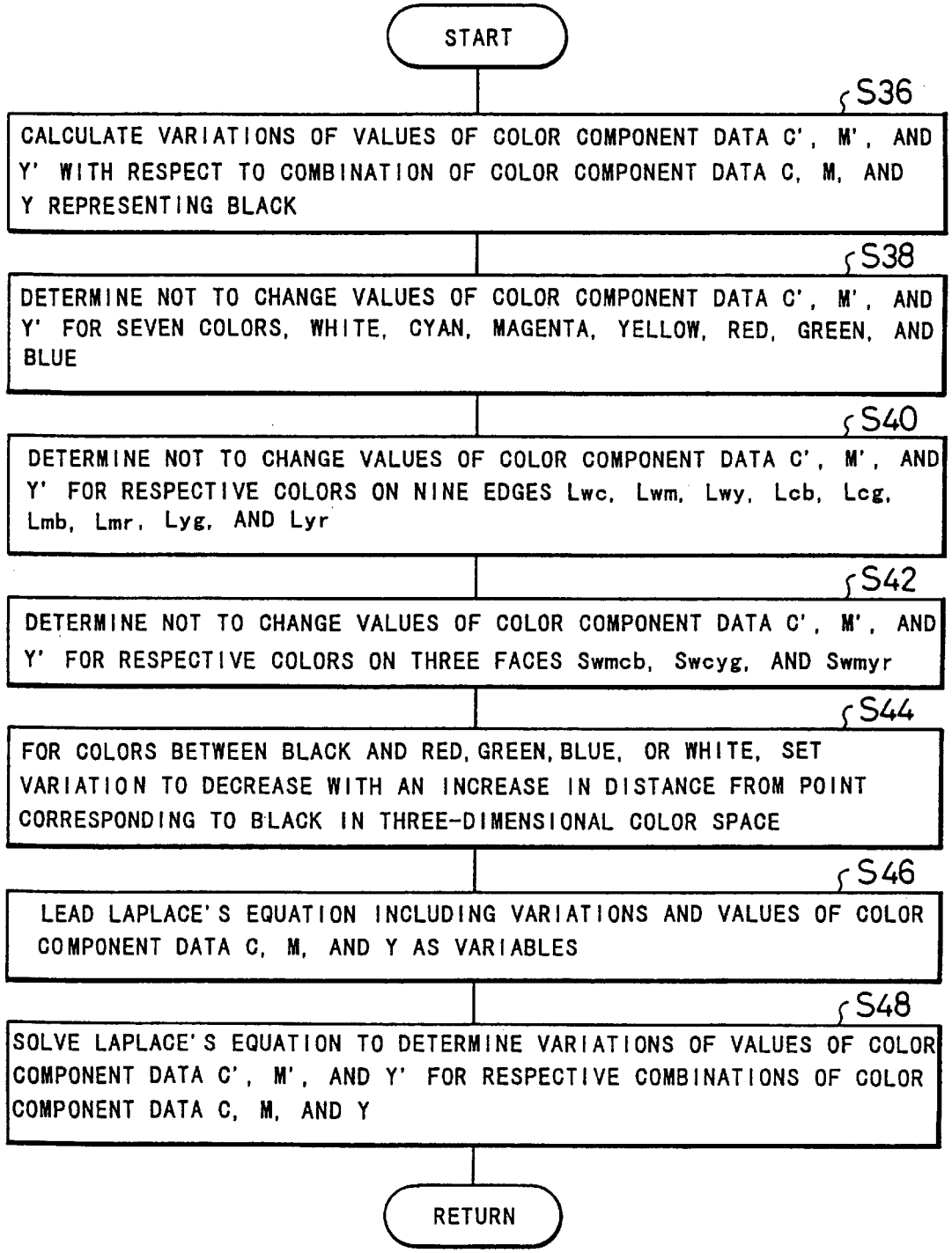
FIG. 10 is a flowchart showing a processing routine for changing a three-dimensional LUT as a second embodiment according to the present invention.

FIG. 10 is a flowchart showing a processing routine for changing a three-dimensional LUT as a second embodiment according to the present invention. The second embodiment relates to the process of varying the values of color component data C', M', and Y' for black and then changing the same for other colors accompanied by the variation regarding black.

Referring to the flowchart of FIG. 10, variations U, V, and W of the values of color component data C', M', and Y' are calculated with respect to black at step S36. It is then determined not to change the values of color component data C', M', and Y' for the seven colors other than black, that is, white, cyan, magenta, yellow, red, green, and blue at step S38, for the colors corresponding to the respective points on nine edges Lwc, Lwm, Lwy, Lcb, Lcg, Lmb, Lmr, Lyg, and Lyr of the rectangular parallelopiped shown in FIG. 3 at step S40, and for the colors corresponding to the respective points on three faces Swmcb, Swcyg, and Swmyr of the rectangular parallelopiped shown in FIG. 3 at step S42. The determination of not to change the values of color component data C', M', and Y' sets the variations U, V, W of the values of color component data C', M', and Y' all equal to (0,0,0) for the respective colors specified above.

At subsequent step S44, for the colors corresponding to the respective points on three edges Lrk, Lgk, and Lbk and one diagonal Dwk that include a vertex Pk corresponding to black as one end in the rectangular parallelopiped shown in FIG. 3, the variations U, V, and W of the values of color component data C', M', and Y' are set to decrease with an increase in distance from the vertex Pk corresponding to black to the respective points on the three edges or the diagonal. For the other colors, at steps S46 and S48, the variations U, V, W of the values of color component data C', M', and Y' are respectively determined according to the Laplace's Equation defined as Equation (5) in the same manner as the first embodiment discussed above.

This procedure enables the variations U, V, and W of the values of color component data C', M', and Y' to be determined for the other colors with a variation in values of color component data C', M', and Y' with respect to black.

In the second embodiment, at step S44 in the flowchart of FIG. 10, for the colors corresponding to the respective points on the three edges Lrk, Lgk, and Lbk that are among the edges of the rectangular parallelopiped and for the colors corresponding to the respective points on one diagonal Dwk that is among the diagonals of the rectangular parallelopiped, the variations U, V, and W of the values of color component data C', M', and Y' are set to decrease with an increase in distance from the vertex Pk corresponding to black to the respective points on the three edges or the diagonal. The processing of step S44 may, however, be omitted when it is desirable to maintain the tone gradation before the change.

In case that the processing of step S44 is omitted, the variations of the values of color component data C', M', and Y' are not significant for the colors close to red, green, and blue, but are rather significant for the colors close to black.

The primary difference between the procedures with and without the processing of step S44 in the flowchart of FIG. 10 is as follows. The procedure with the processing of step S44 enables the linearity of gradation to be reserved for the secondary colors (colors between black and red, green, or blue). The procedure without the processing of step S44, on the other hand, enables the color development to be reserved in areas of high saturation (that is, areas close to red, green and blue).

Figure 11:
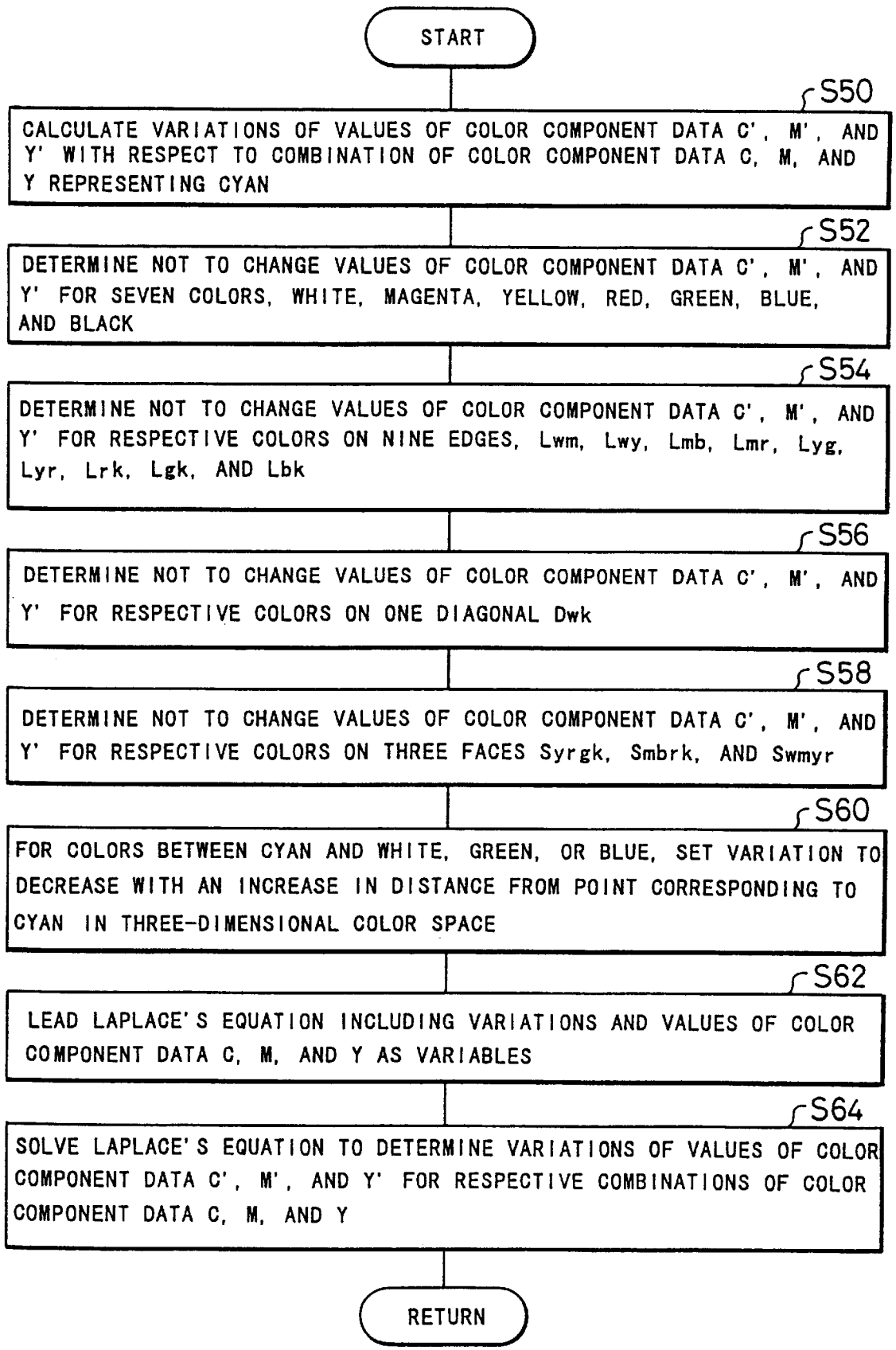
FIG. 11 is a flowchart showing a processing routine for changing a three-dimensional LUT as a third embodiment according to the present invention.

FIG. 11 is a flowchart showing a processing routine for changing a three-dimensional LUT as a third embodiment according to the present invention. The third embodiment relates to the process of varying the values of color component data C', M', and Y' for cyan and then changing the same for other colors accompanied by the variation regarding cyan.

Referring to the flowchart of FIG. 11, variations U, V, and W of the values of color component data C', M', and Y' are calculated with respect to cyan at step S50. It is then determined not to change the values of color component data C', M', and Y' for the seven colors other than cyan, that is, white, magenta, yellow, red, green, blue, and black at step S52, for the colors corresponding to the respective points on nine edges Lwm, Lwy, Lmb, Lmr, Lyg, Lyr, Lrk, Lgk, and Lbk and one diagonal Dwk of the rectangular parallelopiped shown in FIG. 3 at steps S54 and S56, and for the colors corresponding to the respective points on three faces Syrgk, Smbrk, and Swmyr of the rectangular parallelopiped shown in FIG. 3 at step S58. The determination of not to change the values of color component data C', M', and Y' sets the variations U, V, W of the values of color component data C', M', and Y' all equal to (0,0,0) for the respective colors specified above.

At subsequent step S60, for the colors corresponding to the respective points on three edges Lwc, Lcb, and Lcg that include a vertex Pc corresponding to cyan as one end in the rectangular parallelopiped shown in FIG. 3, the variations U, V, and W of the values of color component data C', M', and Y' are set to decrease with an increase in distance from the vertex Pc corresponding to cyan to the respective points on the three edges. For the other colors, at steps S62 and S64, the variations U, V, W of the values of color component data C', M', and Y' are respectively determined according to the Laplace's Equation defined as Equation (5) in the same manner as the first and the second embodiments discussed above.

This procedure enables the variations U, V, and W of the values of color component data C', M', and Y' to be determined for the other colors with a variation in values of color component data C', M', and Y' with respect to cyan.

Figure 12:
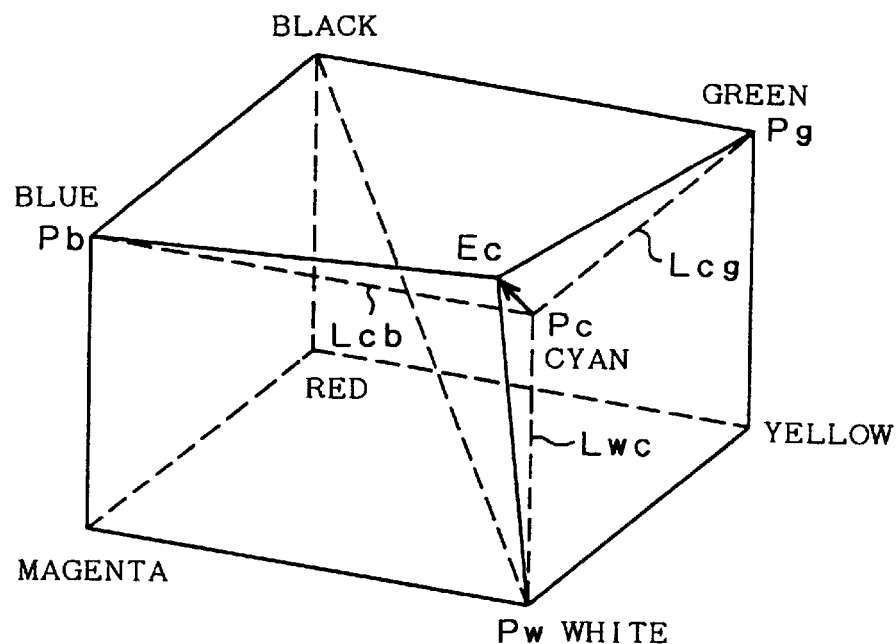
FIG. 12 shows the results of the processing in the third embodiment, wherein the variations U, V, and W of the values of color component data C', M', and Y' are expressed as three-dimensional vectors starting from the corresponding points of the rectangular parallelopiped and terminal points of the three-dimensional vectors are plotted.

FIG. 12 shows the results of the processing in the third embodiment, wherein the variations U, V, and W of the values of color component data C', M', and Y' are expressed as three-dimensional vectors starting from the corresponding points of the rectangular parallelopiped and terminal points of the three-dimensional vectors are plotted.

Referring to FIG. 12, the variations U, V, and W of the values of color component data C', M', and Y' with respect to cyan are given as a three-dimensional vector in the rectangular parallelopiped of FIG. 3. The three-dimensional vector starts from the vertex Pc corresponding to cyan and terminates, for example, at a point Ec. For the colors corresponding to the respective points on the edges Lwc, Lcg, and Lcb, the variations U, V, and W are set to decrease with an increase in distance from the vertex Pc corresponding to cyan to each point on the three edges. Terminal points of three-dimensional vectors starting from the respective points on such lines accordingly form plane curves Ec-Pw, Ec-Pg, and Ec-Pb as shown in FIG. 12.

In the third embodiment, at step S60 in the flowchart of FIG. 11, for the colors corresponding to the respective points on the three edges Lwc, Lcg, and Lcb that are among the edges of the rectangular parallelepiped, the variations U, V, and W of the values of color component data C', M', and Y' are set to decrease with an increase in distance from the vertex Pc corresponding to cyan to the respective points on the three edges. The processing of step S60 may, however, be omitted when it is desirable to maintain the tone gradation before the change.

Figure 13:
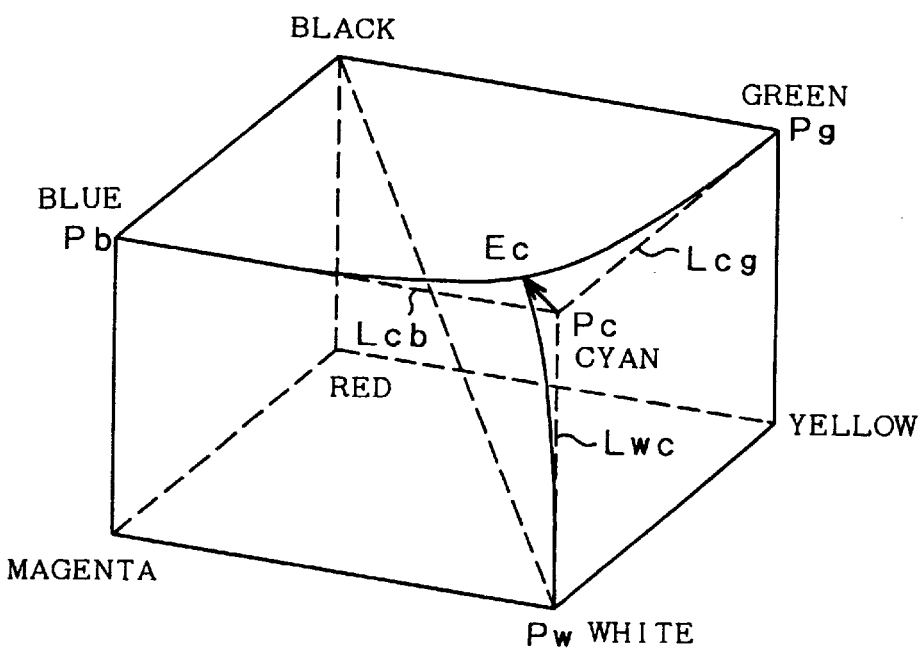
FIG. 13 shows the results without the processing of step S60 of FIG. 11, wherein the variations U, V, and W of the values of color component data C', M', and Y' are expressed as three-dimensional vectors starting from the corresponding points of the rectangular parallelopiped and terminal points of the three-dimensional vectors are plotted.

FIG. 13 shows the results without the processing of step S60 of FIG. 11, wherein the variations U, V, and W of the values of color component data C', M', and Y' are expressed as three-dimensional vectors starting from the corresponding points of the rectangular parallelepiped and terminal points of the three-dimensional vectors are plotted.

As mentioned previously, the variations U, V, W with respect to cyan are expressed as a three-dimensional vector starting from the vertex Pc of the rectangular parallelepiped and terminating at the point Ec as shown in FIG. 13. In case that the processing of step S60 is omitted from the flowchart of FIG. 11, the variations U, V, W of the values of color component data C', M', and Y' are led from the Laplace's Equation at step S64 for the colors corresponding to the respective points on the edges Lwc, Lcg, Lcb. The terminal points of three-dimensional vectors starting from the respective points on the edges Lwc, Lcg, and Lcb form curves Ec-Pw, Ec-Pg, and Ec-Pb as shown in FIG. 13.

As clearly seen from FIG. 13, in case that the processing of step S60 is omitted, the variations of the values of color component data C', M', and Y' are not significant for the colors close to white, green, and blue, but are rather significant for the colors close to cyan.

The primary difference between the procedures with and without the processing of step S60 in the flowchart of FIG. 11 is as follows. The procedure with the processing of step S60 enables the linearity of gradation to be reserved for the color s between cyan and white, green, or blue. The procedure without the processing of step S60, on the other hand, enables the color development to be substantially reserved for the colors close to white, green, and blue.

Figure 14:
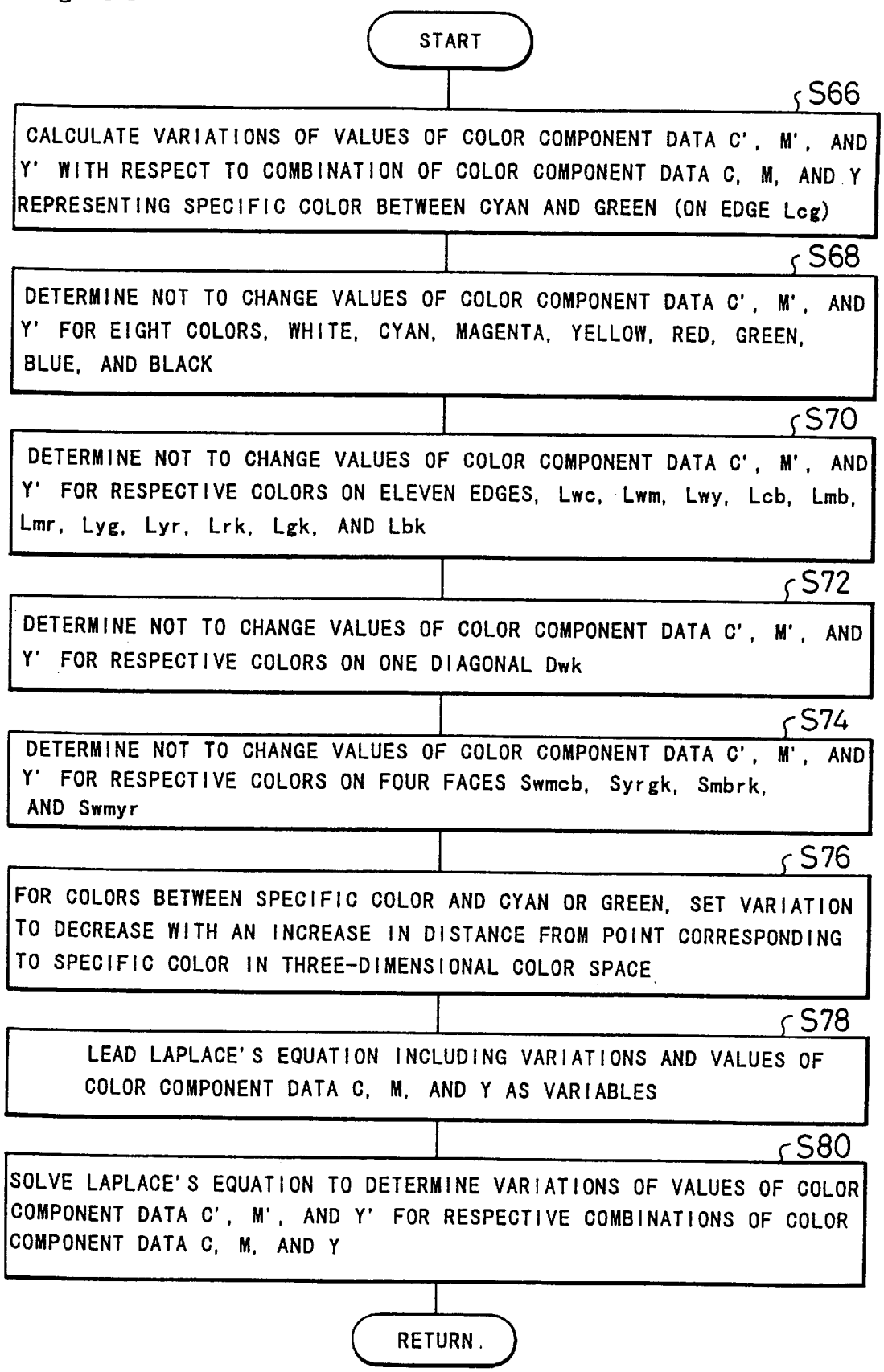
FIG. 14 is a flowchart showing a processing routine for changing a three-dimensional LUT as a fourth embodiment according to the present invention.

FIG. 14 is a flowchart showing a processing routine for changing a three-dimensional LUT as a fourth embodiment according to the present invention. The fourth embodiment relates to the process of varying the values of color component data C', M', and Y' for a specific color between cyan and green (that is, the color corresponding to a specific point on the edge Lcg of the rectangular parallelepiped shown in FIG. 3) and then changing the same for other colors accompanied by the variation regarding the specific color.

Referring to the flowchart of FIG. 14, variations U, V, and w of the values of color component data C', M', and Y' are calculated with respect to the specific color at step S66. It is then determined not to change the values of color component data C', M', and Y' for the eight colors corresponding to the vertexes of the rectangular parallelepiped shown in FIG. 3, that is, white, cyan, magenta, yellow, red, green, blue, and black at step S68, for the colors corresponding to the respective points on eleven edges of the rectangular parallelopiped of FIG. 3 other than the edge Lcg, that is, Lwc, Lwm, Lwy, Lcb, Lmb, Lmr, Lyg, Lyr, Lrk, Lgk, and Lbk, and on one diagonal Dwk in the rectangular parallelepiped of FIG. 3 at steps S70 and S72, and for the colors corresponding to the respective points on four faces Swmcb, Syrgk, Smbrk, and Swmyr of the rectangular parallelepiped shown in FIG. 3 at step S74. The determination of not to change the values of color component data C', M', and Y' sets the variations U, V, W of the values of color component data C', M', and Y' all equal to (0,0,0) for the respective colors specified above.

At subsequent step S76, for the colors corresponding to the respective points on one edge Lcg that includes a point corresponding to the specific color in the rectangular parallelepiped shown in FIG. 3 (that is, the colors between the specific color and cyan or green), the variations U, V, and W of the values of color component data C', M', and Y' are set to decrease with an increase in distance from the point corresponding to the specific color to the respective points on the edge. For the other colors, at steps S78 and S80, the variations U, V, W of the values of color component data C', M', and Y' are respectively determined according to the Laplace's Equation defined as Equation (5) in the same manner as the first through the third embodiments discussed above.

This procedure enables the variations U, V, and W of the values of color component data C', M', and Y' to be determined for the other colors with a variation in values of color component data C', M', and Y' with respect to the specific color.

Figure 15:
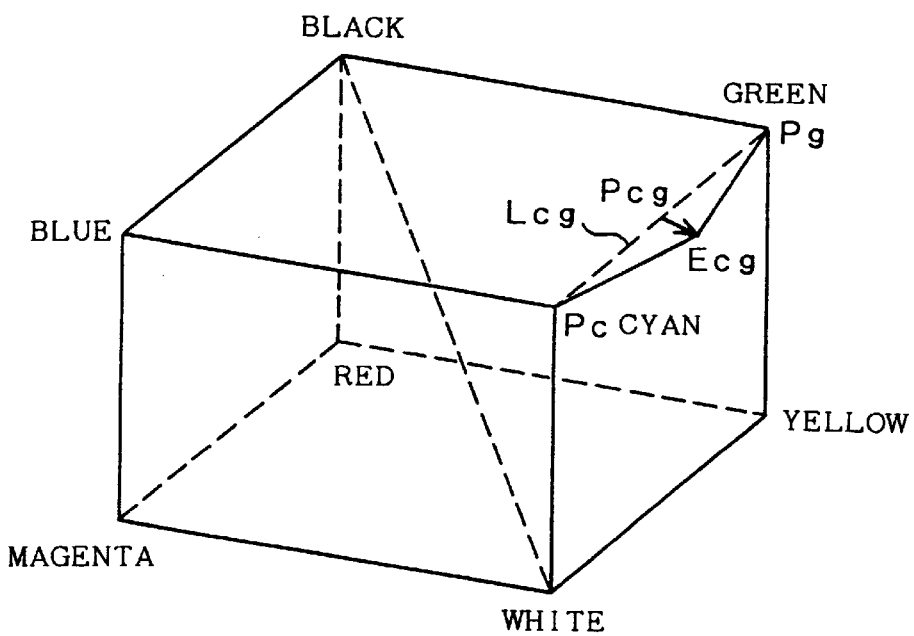
FIG. 15 shows the results of the processing in the fourth embodiment, wherein the variations U, V, and W of the values of color component data C', M', and Y' are expressed as three-dimensional vectors starting from the corresponding points of the rectangular parallelopiped and terminal points of the three-dimensional vectors are plotted.

FIG. 15 shows the results of the processing in the fourth embodiment, wherein the variations U, V, and W of the values of color component data C', M', and Y' are expressed as three-dimensional vectors starting from the corresponding points of the rectangular parallelepiped and terminal points of the three-dimensional vectors are plotted.

Referring to FIG. 15, the variations U, V, and W of the values of color component data C', M', and Y' with respect to a specific color between cyan and green (that is, the color corresponding to a specific point on the edge Lcg) are given as a three-dimensional vector in the rectangular parallelepiped of FIG. 3. The three-dimensional vector starts from a point Pcg corresponding to the specific color between cyan and green and terminates, for example, at a point Ecg. For the colors corresponding to the respective points on the edge Lcg other than the specific color, the variations U, V, and W are set to decrease with an increase in distance from the point Pcg corresponding to the specific color to each point on the edge Lcg. Terminal points of three-dimensional vectors starting from the respective points on the edge Lcg accordingly form plane curves Ecg-Pc and Ecg-Pg as shown in FIG. 15.

In the fourth embodiment, at step S76 in the flowchart of FIG. 14, for the colors corresponding to the respective points on the edge Lcg of the rectangular parallelepiped including the corresponding point Pcg of the specific color, the variations U, V, and W of the values of color component data C', M', and Y' are set to decrease with an increase in distance from the corresponding point Pcg of the specific color to the respective points on the edge Lcg. The processing of step S76 may, however, be omitted when it is desirable to maintain the tone gradation before the change.

Figure 16:
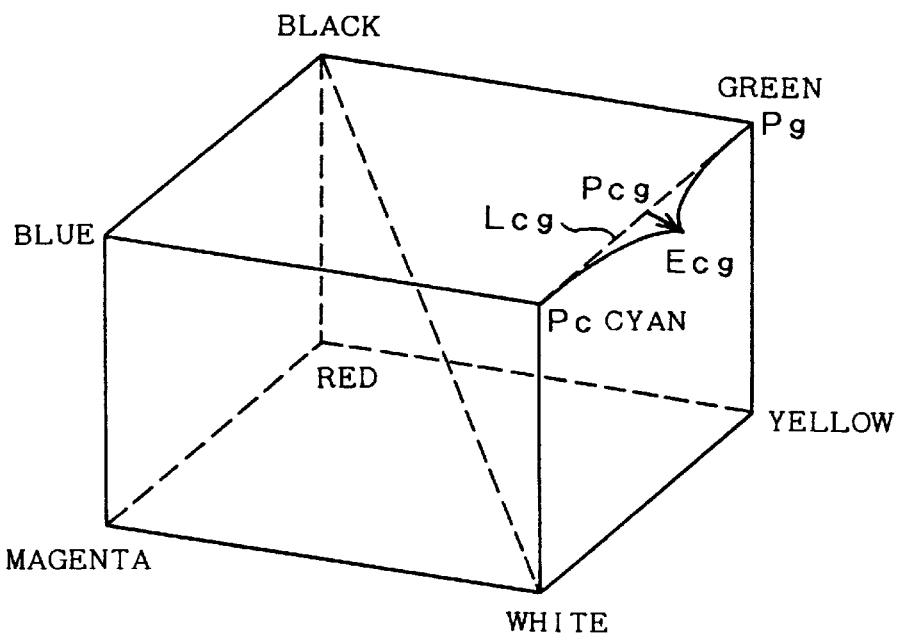
FIG. 16 shows the results without the processing of step S76 of FIG. 14, wherein the variations U, V, and W of the values of color component data C', M', and Y' are expressed as three-dimensional vectors starting from the corresponding points of the rectangular parallelopiped and terminal points of the three-dimensional vectors are plotted.

FIG. 16 shows the results without the processing of step S76 of FIG. 14, wherein the variations U, V, and W of the values of color component data C', M', and Y' are expressed as three-dimensional vectors starting from the corresponding points of the rectangular parallelepiped and terminal points of the three-dimensional vectors are plotted.

As mentioned previously, the variations U, V, W with respect to the specific color are expressed as a three-dimensional vector starting from the corresponding point Pcg on the edge Lcg and terminating at the point Ecg as shown in FIG. 16. In case that the processing of step S76 is omitted from the flowchart of FIG. 14, the variations U, V, W of the values of color component data C', M', and Y' are led from the Laplace's Equation at step S80 for the colors corresponding to the respective points on the edge Lcg other than the point Pcg. The terminal points of three-dimensional vectors starting from the respective points on the edge Lcg form curves Ecg-Pc and Ecg-Pg as shown in FIG. 16.

As clearly seen from FIG. 16, in case that the processing of step S76 is omitted, the variations of the values of color component data C', M', and Y' are not significant for the colors close to cyan and green, but are rather significant for the colors close to the specific color.

The primary difference between the procedures with and without the processing of step S76 in the flowchart of FIG. 14 is as follows. The procedure with the processing of step S76 enables the smoothness of gradation to be reserved for the colors between cyan and green. The procedure without the processing of step S76, on the other hand, enables the color development to be substantially reserved for the colors close to cyan and green.

Figure 17:
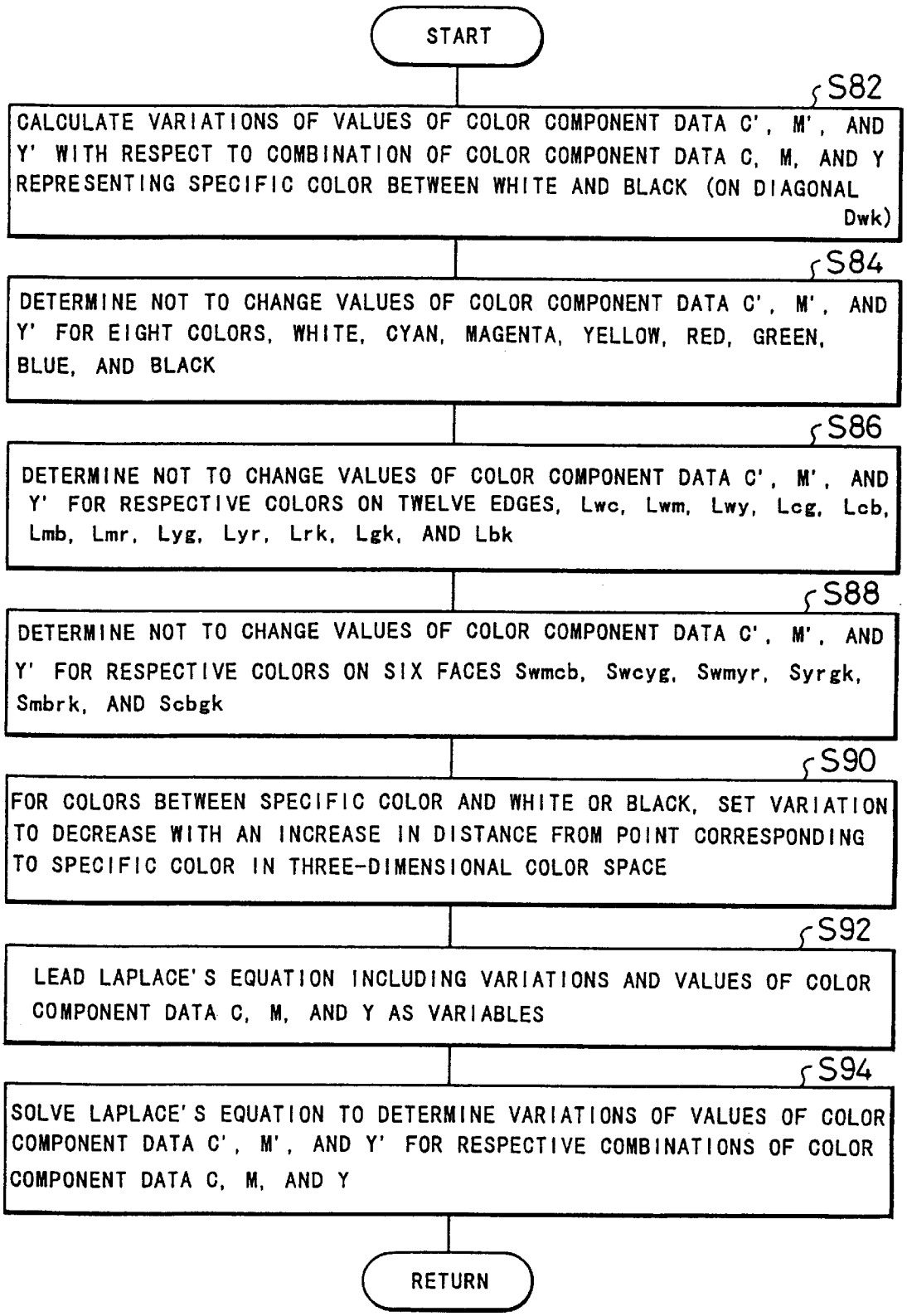
FIG. 17 is a flowchart showing a processing routine for changing a three-dimensional LUT as a fifth embodiment according to the present invention.

FIG. 17 is a flowchart showing a processing routine for changing a three-dimensional LUT as a fifth embodiment according to the present invention. The fifth embodiment relates to the process of varying the values of color component data C', M', and Y' for a specific color between white and black (that is, the color corresponding to a specific point on the diagonal Dwk in the rectangular parallelopiped shown in FIG. 3) and then changing the same for other colors accompanied by the variation regarding the specific color.

Referring to the flowchart of FIG. 17, variations U, V, and W of the values of color component data C', M', and Y' are calculated with respect to the specific color at step S82. It is then determined not to change the values of color component data C', M', and Y' for the eight colors corresponding to the vertexes of the rectangular parallelopiped shown in FIG. 3, that is, white, cyan, magenta, yellow, red, green, blue, and black at step S84, for the colors corresponding to the respective points on twelve edges Lwc, Lwm, Lwy, Lcg, Lcb, Lmb, Lmr, Lyg, Lyr, Lrk, Lgk, and Lbk in the rectangular parallelopiped of FIG. 3 at step S86, and for the colors corresponding to the respective points on six faces Swmcb, Swcyg, Swmyr, Syrgk, Smbrk, and Scbgk of the rectangular parallelopiped shown in FIG. 3 at step S88. The determination of not to change the values of color component data C', M', and Y' sets the variations U, V, W of the values of color component data C', M', and Y' all equal to (0,0,0) for the respective colors specified above.

At subsequent step S90, for the colors corresponding to the respective points on one diagonal Dwk that includes a point corresponding to the specific color in the rectangular parallelopiped shown in FIG. 3 (that is, the colors between the specific color and white or black), the variations U, V, and W of the values of color component data C', M', and Y' are set to decrease with an increase in distance from the point corresponding to the specific color to the respective points on the diagonal. For the other colors, at steps S92 and S94, the variations U, V, W of the values of color component data C', M', and Y' are respectively determined according to the Laplace's Equation defined as Equation (5) in the same manner as the first through the fourth embodiments discussed above.

This procedure enables the variations U, V, and W of the values of color component data C', M', and Y' to be determined for the other colors with a variation in values of color component data C', M', and Y' with respect to the specific color.

Figure 18:
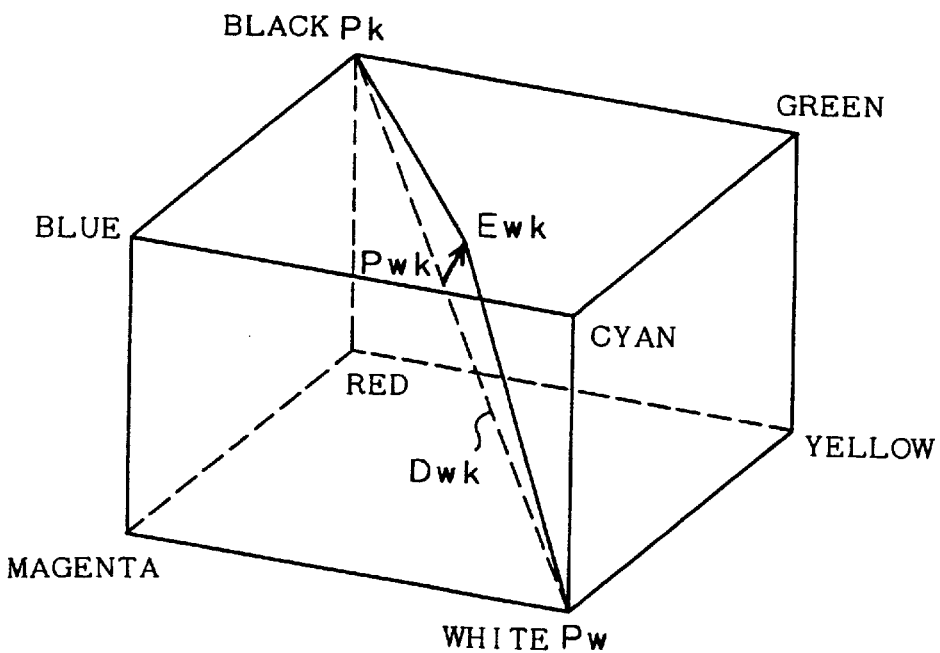
FIG. 18 shows the results of the processing in the fifth embodiment, wherein the variations U, V, and W of the values of color component data C', M', and Y' are expressed as three-dimensional vectors starting from the corresponding points of the rectangular parallelopiped and terminal points of the three-dimensional vectors are plotted.

FIG. 18 shows the results of the processing in the fifth embodiment, wherein the variations U, V, and W of the values of color component data C', M', and Y' are expressed as three-dimensional vectors starting from the corresponding points of the rectangular parallelopiped and terminal points of the three-dimensional vectors are plotted.

Referring to FIG. 18, the variations U, V, and W of the values of color component data C', M', and Y' with respect to a specific color between white and black (that is, the color corresponding to a specific point on the diagonal Dwk) are given as a three-dimensional vector in the rectangular parallelopiped of FIG. 3. The three-dimensional vector starts from a point Pwk corresponding to the specific color between white and black and terminates, for example, at a point Ewk. For the colors corresponding to the respective points on the diagonal Dwk other than the specific color, the variations U, V, and W are set to decrease with an increase in distance from the point Pwk corresponding to the specific color to each point on the diagonal Dwk. Terminal points of three-dimensional vectors starting from the respective points on the diagonal Dwk accordingly form plane curves Ewk-Pw and Ewk-Pk as shown in FIG. 18.

In the fifth embodiment, at step S90 in the flowchart of FIG. 17, for the colors corresponding to the respective points on the diagonal Dwk in the rectangular parallelopiped including the corresponding point Pwk of the specific color, the variations U, V, and W of the values of color component data C', M', and Y' are set to decrease with an increase in distance from the corresponding point Pwk of the specific color to the respective points on the diagonal Dwk. The processing of step S90 may, however, be omitted when it is desirable to maintain the tone gradation before the change.

Figure 19:
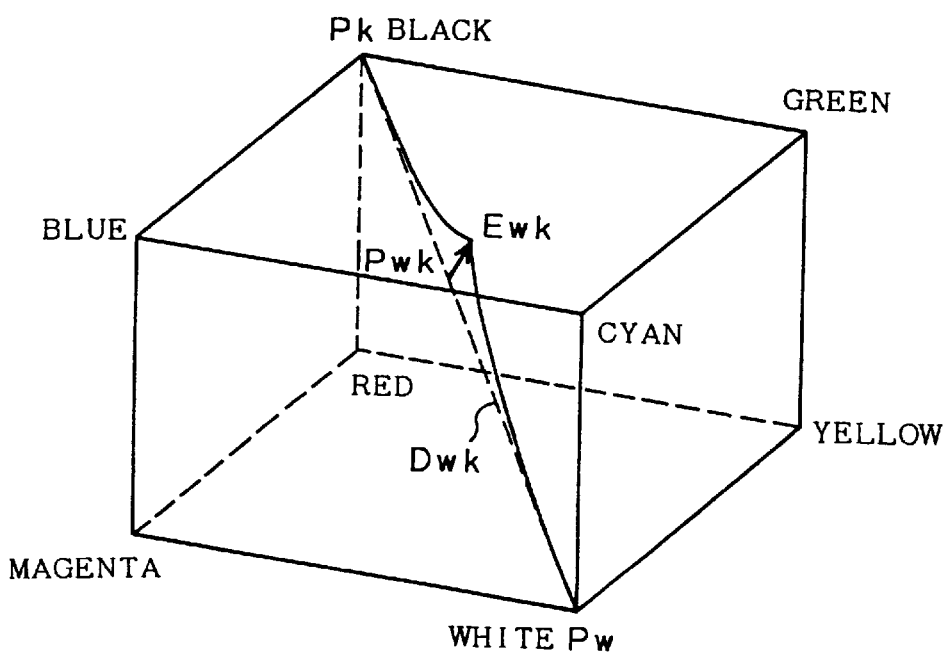
FIG. 19 shows the results without the processing of step S90 of FIG. 17, wherein the variations U, V, and W of the values of color component data C', M', and Y' are expressed as three-dimensional vectors starting from the corresponding points of the rectangular parallelopiped and terminal points of the three-dimensional vectors are plotted.

FIG. 19 shows the results without the processing of step S90 of FIG. 17, wherein the variations U, V, and W of the values of color component data C', M', and Y' are expressed as three-dimensional vectors starting from the corresponding points of the rectangular parallelopiped and terminal points of the three-dimensional vectors are plotted.

As mentioned previously, the variations U, V, W with respect to the specific color are expressed as a three-dimensional vector starting from the corresponding point Pwk on the diagonal Dwk and terminating at the point Ewk as shown in FIG. 19. In case that the processing of step S90 is omitted from the flowchart of FIG. 17, the variations U, V, W of the values of color component data C', M', and Y' are led from the Laplace's Equation at step S94 for the colors corresponding to the respective points on the diagonal Dwk other than the point Pwk. The terminal points of three-dimensional vectors starting from the respective points on the diagonal Dwk form curves Ewk-Pw and Ewk-Pk as shown in FIG. 19.

As clearly seen from FIG. 19, in case that the processing of step S90 is omitted, the variations of the values of color component data C', M', and Y' are not significant for the colors close to white and black, but are rather significant for the colors close to the specific color.

The primary difference between the procedures with and without the processing of step S90 in the flowchart of FIG. 17 is as follows. The procedure with the processing of step S90 enables the linearity of gradation to be reserved for achromatic colors. The procedure without the processing of step S90, on the other hand, enables the accuracy to be maintained in an area close to white.

Figure 20:
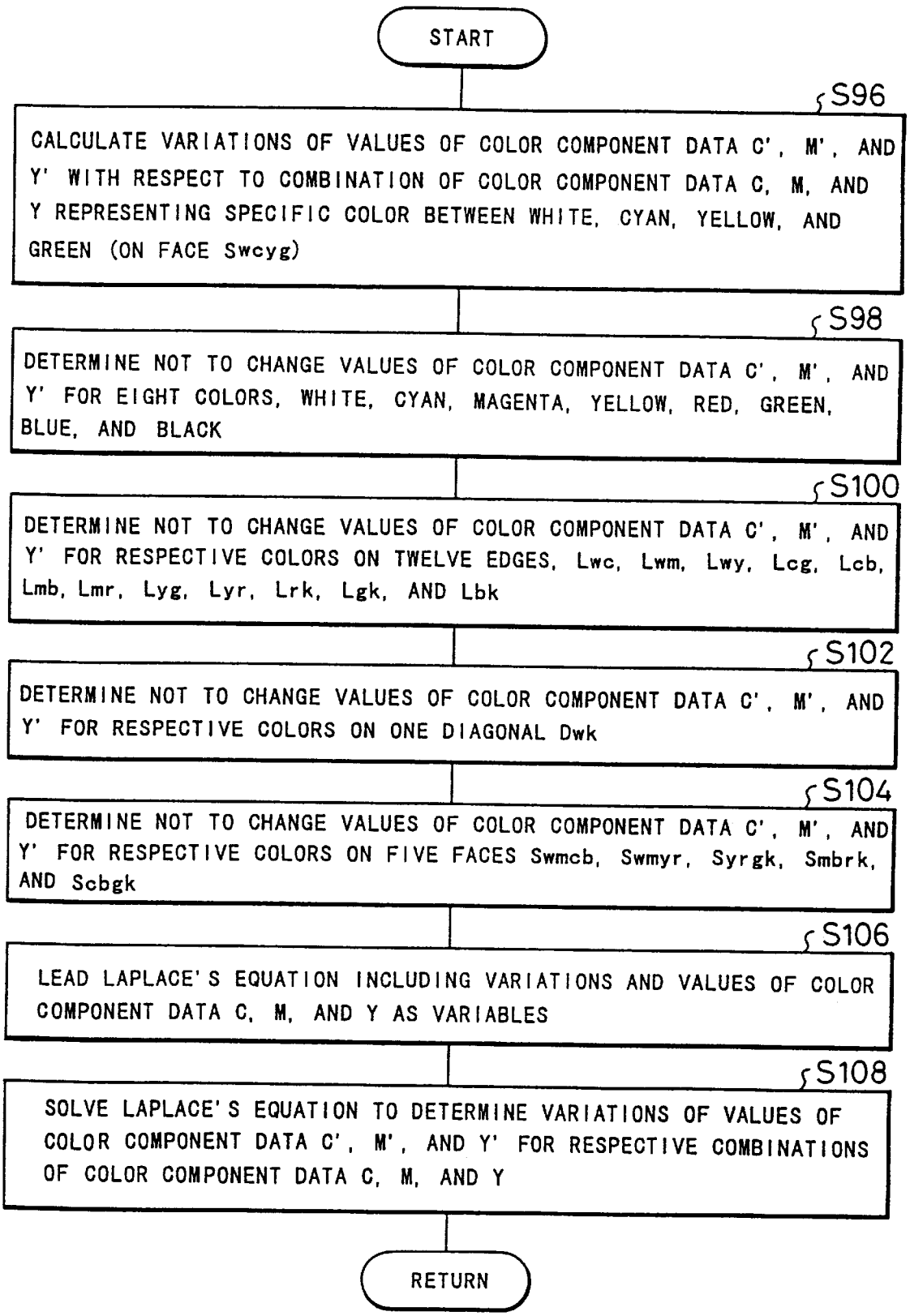
FIG. 20 is a flowchart showing a processing routine for changing a three-dimensional LUT as a sixth embodiment according to the present invention.

FIG. 20 is a flowchart showing a processing routine for changing a three-dimensional LUT as a sixth embodiment according to the present invention. The sixth embodiment relates to the process of varying the values of color component data C', M', and Y' for a specific color between white, cyan, yellow, and green (that is, the color corresponding to a specific point on the face Swcyg in the rectangular parallelopiped shown in FIG. 3) and then changing the same for other colors accompanied by the variation regarding the specific color.

Referring to the flowchart of FIG. 20, variations U, V, and W of the values of color component data C', M', and Y' are calculated with respect to the specific color at step S96. It is then determined not to change the values of color component data C', M', and Y' for the eight colors corresponding to the vertexes of the rectangular parallelopiped shown in FIG. 3, that is, white, cyan, magenta, yellow, red, green, blue, and black at step S98, for the colors corresponding to the respective points on twelve edges Lwc, Lwm, Lwy, Lcg, Lcb, Lmb, Lmr, Lyg, Lyr, Lrk, Lgk, and Lbk and on one diagonal Dwk in the rectangular parallelopiped of FIG. 3 at steps S100 and S102, and for the colors corresponding to the respective points on five faces Swmcb, Swmyr, Syrgk, Smbrk, and Scbgk other than the face Swcyg in the rectangular parallelopiped shown in FIG. 3 at step S104. The determination of not to change the values of color component data C', M', and Y' sets the variations U, V, W of the values of color component data C', M', and Y' all equal to (0,0,0) for the respective colors specified above.

For the other colors, at steps S106 and S108, the variations U, V, W of the values of color component data C', M', and Y' are respectively determined according to the Laplace's Equation defined as Equation (5) in the same manner as the first through the fifth embodiments discussed above.

This procedure enables the variations U, V, and W of the values of color component data C', M', and Y' to be determined for the other colors with a variation in values of color component data C', M', and Y' with respect to the specific color.

Figure 21:
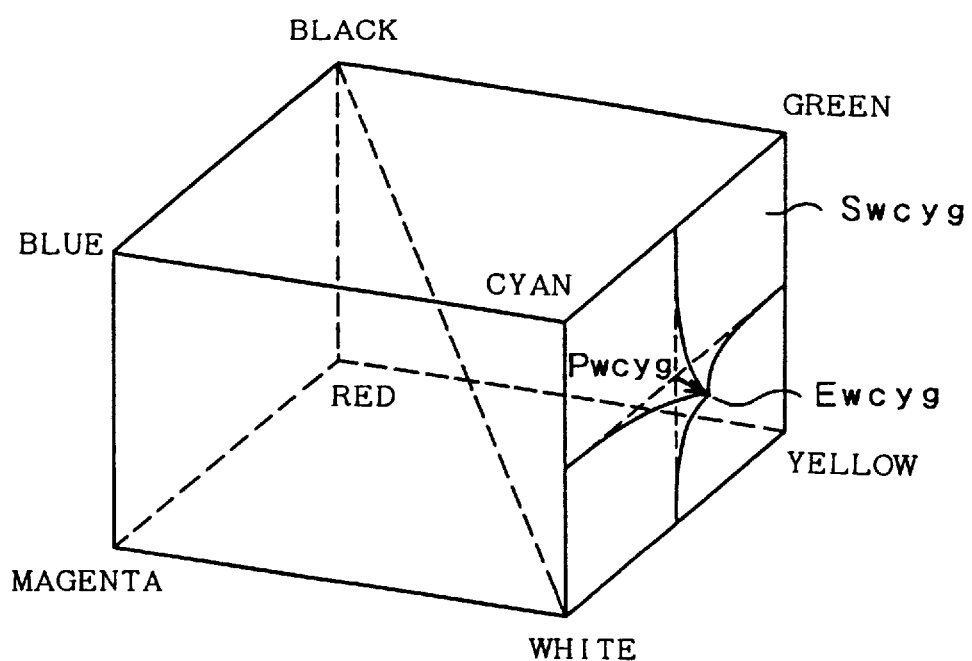
FIG. 21 shows the results of the processing in the sixth embodiment, wherein the variations U, V, and W of the values of color component data C', M', and Y' are expressed as three-dimensional vectors starting from the corresponding points of the rectangular parallelopiped and terminal points of the three-dimensional vectors are plotted.

FIG. 21 shows the results of the processing in the sixth embodiment, wherein the variations U, V, and W of the values of color component data C', M', and Y' are expressed as three-dimensional vectors starting from the corresponding points of the rectangular parallelopiped and terminal points of the three-dimensional vectors are plotted.

Referring to FIG. 21, the variations U, V, and W of the values of color component data C', M', and Y' with respect to a specific color between white, cyan, yellow, and green (that is, the color corresponding to a specific point on the face Swcyg) are given as a three-dimensional vector in the rectangular parallelopiped of FIG. 3. The three-dimensional vector starts from a point Pwcyg corresponding to the specific color between white, cyan, yellow, and green and terminates, for example, at a point Ewcyg. For the colors corresponding to the respective points on the face Swcyg other than the specific color, the variations U, V, and W of the values of color component data C', M', and Y' are led from the Laplace's Equation at step S108 in the flowchart of FIG. 20. Terminal points of three-dimensional vectors starting from the respective points on the face Swcyg accordingly form curved surfaces as shown in FIG. 21.

In the sixth embodiment, at step S104 in the flowchart of FIG. 20, the variations U, V, and W of the values of color component data C', M', and Y' are set equal to (0,0,0) for the colors corresponding to the respective points on the five faces Swmcb, Swmyr, Syrgk, Smbrk, and Scbgk of the rectangular parallelopiped other than the face Swcyg. The processing of step S104 may, however, be omitted according to the requirements.

The procedure without the processing of step S104 in the flowchart of FIG. 20 may result in a little variation in colors having the highest saturation (that is, the colors corresponding to the respective points on the faces of the rectangular parallelopiped shown in FIG. 3). This increases the color difference (error) colorimetrically, but may exert the favorable visual effects.

Figure 22:
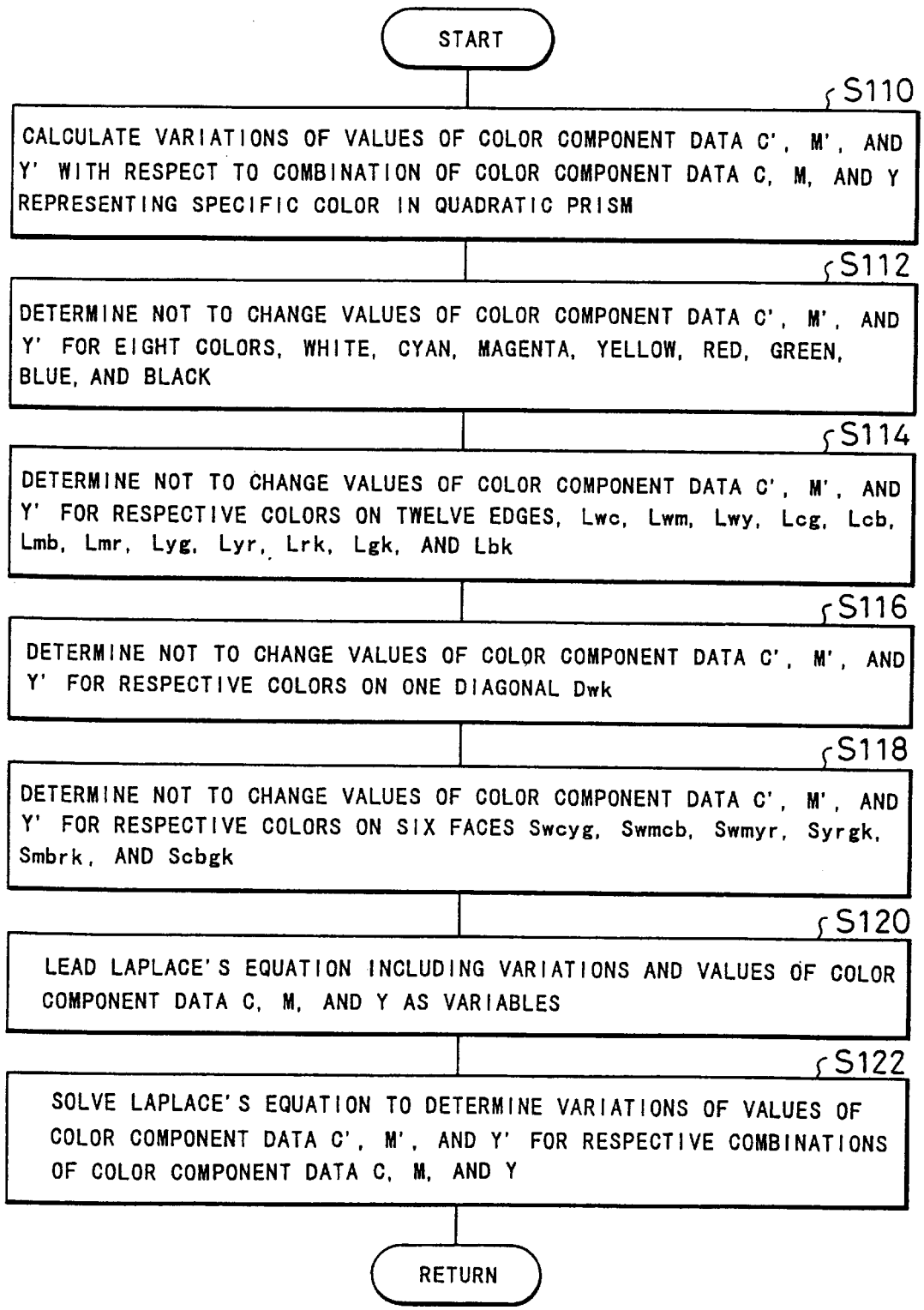
FIG. 22 is a flowchart showing a processing routine for changing a three-dimensional LUT as a seventh embodiment according to the present invention.

FIG. 22 is a flowchart showing a processing routine for changing a three-dimensional LUT as a seventh embodiment according to the present invention. The seventh embodiment relates to the process of varying the values of color component data C', M', and Y' for the color corresponding to a specific point in the rectangular parallelopiped shown in FIG. 3 (specific color) and then changing the same for other colors accompanied by the variation regarding the specific color.

Referring to the flowchart of FIG. 22, variations U, V, and W of the values of color component data C', M', and Y' are calculated with respect to the specific color at step S110. It is then determined not to change the values of color component data C', M', and Y' for the eight colors corresponding to the vertexes of the rectangular parallelopiped shown in FIG. 3, that is, white, cyan, magenta, yellow, red, green, blue, and black at step S112, for the colors corresponding to the respective points on twelve edges Lwc, Lwm, Lwy, Lcg, Lcb, Lmb, Lmr, Lyg, Lyr, Lrk, Lgk, and Lbk and on one diagonal Dwk in the rectangular parallelopiped of FIG. 3 at steps S114 and S116, and for the colors corresponding to the respective points on six faces Swcyg, Swmcb, Swmyr, Syrgk, Smbrk, and Scbgk in the rectangular parallelopiped shown in FIG. 3 at step S118. The determination of not to change the values of color component data C', M', and Y' sets the variations U, V, W of the values of color component data C', M', and Y' all equal to (0,0,0) for the respective colors specified above.

For the other colors, at steps S120 and S122, the variations U, V, W of the values of color component data C', M', and Y' are respectively determined according to the Laplace's Equation defined as Equation (5) in the same manner as the first through the sixth embodiments discussed above.

This procedure enables the variations U, V, and W of the values of color component data C', M', and Y' to be determined for the other colors with a variation in values of color component data C', M', and Y' with respect to the specific color.

In the seventh embodiment, at step S118 in the flowchart of FIG. 22, the variations U, V, and W of the values of color component data C', M', and Y' are set equal to (0,0,0) for the colors corresponding to the respective points on the six faces Swcyg, Swmcb, Swmyr, Syrgk, Smbrk, and Scbgk of the rectangular parallelopiped. The processing of step S118 may, however, be omitted according to the requirements.

The procedure without the processing of step S118 in the flowchart of FIG. 22 may result in a little variation in colors having the highest saturation (that is, the colors corresponding to the respective points on the faces of the rectangular parallelopiped shown in FIG. 3). This increases the color difference (error) colorimetrically, but may exert the favorable visual effects.

As discussed above, the procedures of the second through the seventh embodiments vary the values of color component data C', M', and Y' for any specific color as well as white and change the same for the other colors accompanied by the variation with respect to the specific color.

The processing of the above embodiments can be implemented only when a specific color to be changed is given as a combination of color component data C, M, and Y (that is, as an address in the three-dimensional LUT). In the actual state, however, only the color itself is specified like 'more vivid effect to the complexion' and no concrete combination of color component data C, M, and Y (values of color component data C, M, and Y) are given.

The following describes the process of determining the values of color component data C, M, and Y from the specified color for the four different cases.

(1) In case that a data area in which a specific color to be changed exists has been known in input data prior to color conversion (for example, the position of byte in data stream)

The values of color component data C, M, Y, and K located in the data area are read from the input data and directly used as the values of color component data C, M, and Y. When the values of color component data C, M, Y, and K located in the data area are not uniform, representative values should be obtained, for example, by averaging such non-uniform values.

(2) In case that a specific color to be changed has been known in output data after color conversion (that is, values of color component data C', M', Y', and K)

In this case, there are two applicable processes as given below.

(a) The whole range of a three-dimensional LUT is scanned, based on the known values of color component data C', M', and Y', in order to find an address of the three-dimensional LUT at which values closest to the known values are registered. The values read from the address are directly used as the values of color component data C, M, and Y.

(b) The processes executed in the LUT generating element shown in FIG. 24, that is, formation of a polynomial, transformation of CMY to L*a*b*, gamut mapping, formation of a polynomial, and transformation of L*a*b* to CMY (the processes executed by the processing circuits 42, 26, 28, 44, and 30), are carried out in a reverse order. In accordance with a concrete procedure, the matrix arithmetic operation circuit 30 for transformation of L*a*b* to CMY and the processing circuit 44 for formation of a polynomial function in the reverse direction to calculate the values of L*a*b* data from the known values of color component data C', M', and Y'. The matrix arithmetic operation circuit 26 for transformation of CMY to L*a*b* and the processing circuit 42 for formation of a polynomial then function in the reverse direction to calculate the values of color component data C, M, and Y from the values of L*a*b* data. Since the gamut mapping process is often irreversible, reverse gamut mapping process (the processing in reverse of the processing by the gamut mapping circuit 28) is not carried out.

(3) In case that the position of a specific color to be changed has been known in a color converted image (resulting print by a simulation device)

The color of the known position in the image is measured, so that the values of L*a*b* data are obtained. When the values of the L*a*b* data obtained by colorimetry are not uniform, representative values should be obtained, for example, by averaging such non-uniform values. Some processes executed in the LUT generating element shown in FIG. 24, that is, formation of a polynomial, transformation of CMY to L*a*b*, and gamut mapping (the processes executed by the processing circuits 42, 26, and 28), are carried out in a reverse order. In accordance with a concrete procedure, the matrix arithmetic operation circuit 26 for transformation of CMY to L*a*b* and the processing circuit 42 for formation of a polynomial function in the reverse direction to calculate the values of color component data C, M, and Y from the values of L*a*b* data obtained by colorimetry. Reverse gamut mapping process is not carried out here.

(4) In case that the position of a specific color to be changed has been known in an image prior to color conversion (resulting print by a target device)

The color of the known position in the image is measured, so that the values of L*a*b* data are obtained. When the values of the L*a*b* data obtained by colorimetry are not uniform, representative values should be obtained, for example, by averaging such non-uniform values. Some processes executed in the LUT generating element shown in FIG. 24, that is, formation of a polynomial and transformation of CMY to L*a*b* (the processes executed by the processing circuits 42 and 26), are carried out in a reverse order. In accordance with a concrete procedure, the matrix arithmetic operation circuit 26 for transformation of CMY to L*a*b* and the processing circuit 42 for formation of a polynomial function in the reverse direction to calculate the values of color component data C, M, and Y from the values of L*a*b* data obtained by colorimetry.

When a color to be changed is specified, the values of color component data C, M, and Y representing the specific color can be obtained in the manner discussed above.

The present invention is not restricted to the above embodiments or applications, but there may be many modifications, changes, and alterations without departing from the scope and the spirit of the main characteristics of the present invention. Some examples of modification are given below.

The procedures of the above embodiments vary the values of color component data C', M', and Y' for one specific color and then change the same for the other colors accompanied by the variation with respect to the specific color. The principle of the present invention is, however, also applicable to the process of specifying two or more colors and carrying out the variation with respect to the two or more specific colors. In this case, the specific colors generally have different color components for which the variations U, V, and W of the values of color component data C', M', and Y' should be set equal to (0,0,0). A special care is thus required in order to prevent the interference.

Figure 23:
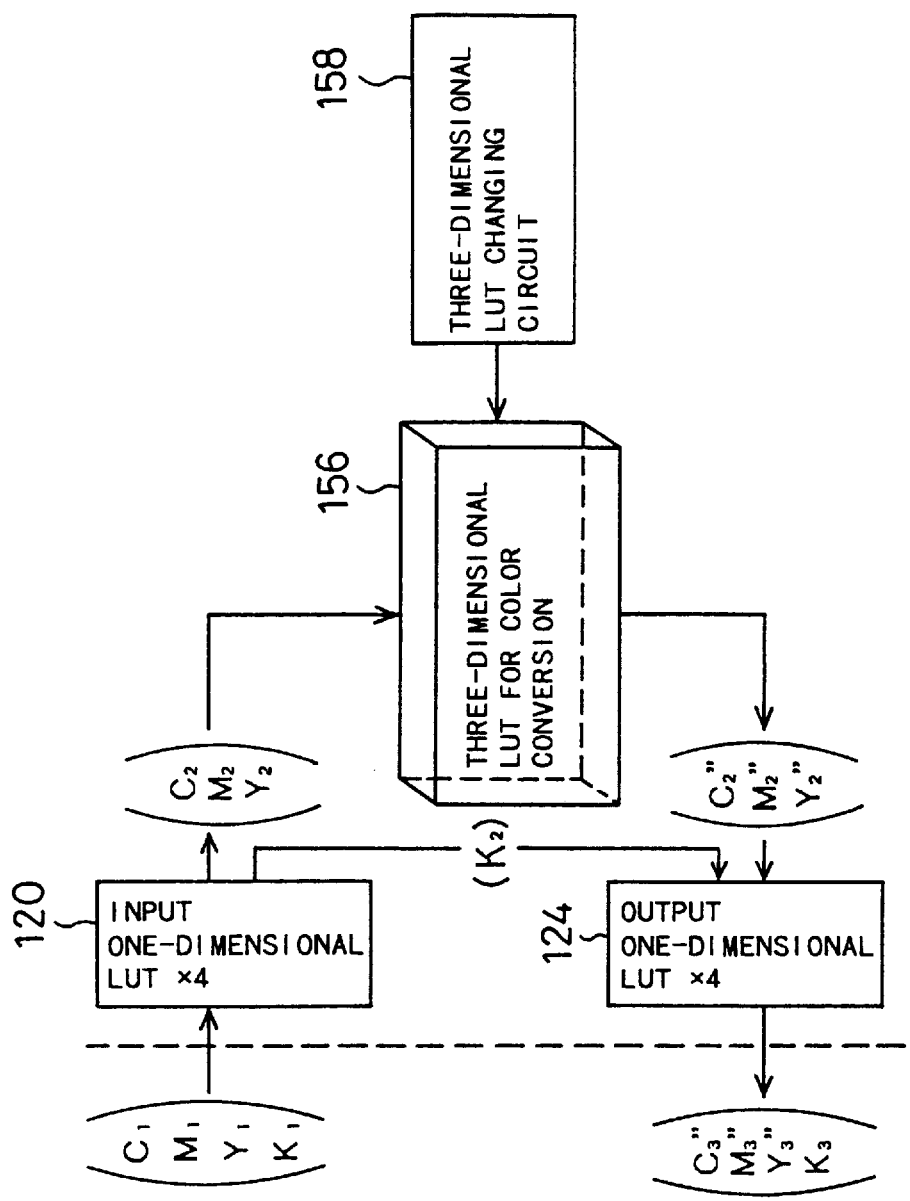
FIG. 23 is a block diagram illustrating an essential part of a color conversion apparatus using a modified three-dimensional LUT for color conversion.

The above embodiments based on the method of changing a data conversion table of the present invention create a three-dimensional LUT 150 for addition of variations as shown in FIG. 8 and change the values of color component data C', M', and Y' using the three-dimensional LUT 150 for addition of variation, the conventional three-dimensional LUT 122 for color conversion, and the adder circuit 152. The two three-dimensional LUTs 122 and 150 and one adder circuit 152 may, however, be replaced by one three-dimensional LUT 156 as shown in FIG. 23. In this modified structure, the changed values of color component data C', M', and Y' after the change are stored at the respective addresses specified by combinations of the values of color component data C, M, and Y in the three-dimensional LUT 156. The changed values are readily obtained by adding the variations to the original values of color component data C', M', and Y' prior to the change. The arithmetic operation for obtaining the changed values is carried out with the calculation of variations in a three-dimensional LUT changing circuit 158.

In the above embodiments, the Laplace's Equation defined as Equation (5) is used for determining the variations U, V, and W of color component data C', M', and Y' with respect to the lattice point P. The present invention is, however, not restricted to the Laplace's Equation, but any conditional equation representing a spatial distribution in a field may be applicable. Whereas the Laplace's Equation is applied to an electrostatic field that replaces a color space in the above embodiments, a similar equation may be applied to a magnetic field that replaces the color space, or alternatively an equation regarding the attractive forces may be applied to a gravitational field that replaces the color space.

In the above embodiments, the three-dimensional LUT for color conversion that is to be changed has three primary color component data C, M, and Y as inputs and color-converted three primary color component data C, M, and Y as outputs. The principle of the present invention is, however, not restricted to this structure. By way of example, the three-dimensional LUT may have three primary color component data C, M, and Y as inputs and color-converted color component data C, M, Y, and K or three primary color component data R, G, and B as outputs. Alternatively, the three-dimensional LUT may have three primary color component data R. G, and B as inputs and color-converted three primary color component data R, G, and B, three primary color component data C, M, and Y, or color component data C, M, Y, and K as outputs. In case that the contents of the three-dimensional LUT having the three primary color component data R, G, and B as inputs are to be changed, the three-dimensional color space has color component data R, G., and B set as rectangular coordinate axes. In case that the contents of the three-dimensional LUT having the color component data C, M, Y, and K as outputs are to be changed, there are four variations obtained for the respective color component data C, M, Y, and K.

In the above embodiments, the three-dimensional LUT of interest that is to be changed is a three-dimensional LUT for color conversion. The principle of the present invention is, however, not restricted to such a three-dimensional LUT. Any three-dimensional LUT having at least three different pieces of color component data as inputs, such as the three primary color component data C, M, and Y or the three primary color component data R, G, and B, can be specified as the three-dimensional LUT of interest. The output data are not necessarily limited to the color component data. The number of output data is also not restricted to the three different pieces of data, such as the color component data C, M, and Y, or the four different pieces of data, such as the color component data C, M, Y, and K. only one piece, two pieces, or five or more different pieces of data may be specified as output data.

It should be clearly understood that the embodiments discussed above are only illustrative and not restrictive in any sense. The scope and spirit of the present invention are limited only by the terms of the appended claims.

What is claimed is:

1. A method of converting color component data, comprising the steps of:
   (a) providing a data conversion table that converts color component data of a first color system to converted color component data for at least one color component of a second color system;
   (b) changing first values of converted color component data in said data conversion table for a specific combination of color component data of said first color system, thereby obtaining first changed values;
   (c) changing second values of converted color component data in said data conversion table for other combinations of color component data of said first color system other than said specific combination; and
   (d) converting, with said data conversion table, the color component data of said first color system to the converted color component data of said second color system; and wherein
   said step (c) comprises the steps of:
      (1) determining differences between said first values and said first changed values;
      (2) determining non-subject combinations of color component data of said first color system for which values of converted color component data are not to be changed;
      (3) assuming an equation representing spatial distribution of differences to be used in said changing said second values for said other combinations in a color space of said first color system; and
      (4) solving said equation to determine said differences to be used in said changing said second values for said other combinations other than said specific combination, under conditions that the differences for said specific combination are equal to the differences determined at step (1) and that the differences for said non-subject combinations are equal to zero.

2. A method in accordance with claim 1, wherein said first color system consists of three color components, and wherein
   said specific combination is selected among eight combinations of color component data, said eight combinations comprising: one combination in which the values of three color components of said first color system are all equal to zero; one combination in which the values of three color components of said first color system are all equal to maximum values; three combinations in which the value of any one color component of said first color system is equal to zero and the values of the other two color components are equal to the maximum values; and three combinations in which the values of any two color components of said first color system are equal to zero and the value of the other one color component is equal to the maximum value.

3. A method in accordance with claim 2, wherein said non-subject combinations comprise seven combinations among said eight combinations except said specific combination.

4. A method in accordance with claim 3, wherein
   said non-subject combinations further comprise combinations of color component data represented by respective points on nine edges among twelve edges of a hexahedron in said color space, eight vertexes of said hexahedron representing said eight combinations of color component data, each of three edges of said hexahedron other than said nine edges starting from a specific vertex representing said specific combination.

5. A method in accordance with claim 4, wherein
   said non-subject combinations further comprise combinations of color component data represented by respective points on first three faces among six faces of said hexahedron, each of second three faces of said hexahedron other than said first three faces comprising said tree edges starting from said specific vertex.

6. A method in accordance with claim 5, wherein
   said non-subject combinations further comprise combinations of color component data represented by respective points on at least one of three diagonals among four diagonals running through said hexahedron, one diagonal of said hexahedron other than said three diagonals starting from said specific vertex.

7. A method in accordance with claim 6, wherein said conditions in said step (4) further comprise a condition that, for combinations of color component data represented by respective points on said three edges starting from the specific vertex and on said one diagonal starting from said specific vertex, the differences decrease as a distance from said specific vertex to the respective points increases.

8. A method in accordance with claim 4, wherein
said non-subject combinations further comprise combinations of color component data represented by respective points on at least one of three diagonals among four diagonals running through said hexahedron, one diagonal of said hexahedron other than said three diagonals starting from said specific vertex.

9. A method in accordance with claim 8, wherein said conditions in said step (4) further comprise a condition that, for combinations of color component data represented by respective points on said three edges starting from the specific vertex and on said one diagonal starting from said specific vertex, the differences decrease as a distance from said specific vertex to the respective points increases.

10. A method in accordance with claim 2, wherein said non-subject combinations are selected among seven combinations among said eight combinations except said specific combination.

11. A method in accordance with claim 1, wherein said first color system consists of three color components, and wherein
said specific combination is combination of color component data represented by a specific point on one of twelve edges of a hexahedron in said color space, eight vertexes of said hexahedron representing eight combinations of color component data, said eight combinations comprising: one combination in which the values of three color components of said first color system are all equal to zero; one combination in which the values of three color components of said first color system are all equal to maximum values; three combinations in which the value of any one color component of said first color system is equal to zero and the values of the other two color components are equal to the maximum values; and three combinations in which the values of any two color components of said first color system are equal to zero and the value of the other one color component is equal to the maximum value.

12. A method in accordance with claim 11, wherein said non-subject combinations comprise said eight combinations.

13. A method in accordance with claim 12, wherein said non-subject combinations further comprise combinations of color component data represented by respective points on eleven edges among said twelve edges of said hexahedron, one edge of said hexahedron other than said eleven edges including said specific point.

14. A method in accordance with claim 13, wherein said non-subject combinations further comprise combinations of color component data represented by respective points on four faces among six faces of said hexahedron, each of two faces of said hexahedron other than said four faces comprising said one edge including said specific point.

15. A method in accordance with claim 14, wherein said non-subject combinations further comprise combinations of color component data represented by respective points on at least one diagonal among four diagonals running through said hexahedron.

16. A method in accordance with claim 15, wherein said conditions in said step (4) further comprise a condition that, for combinations of color component data represented by respective points on said one edge including said specific point, the differences decrease as a distance from said specific point to the respective points increases.

17. A method in accordance with claim 13, wherein said non-subject combinations further comprise combinations of color component data represented by respective points on at least one diagonal among four diagonals running through said hexahedron.

18. A method in accordance with claim 17, wherein said conditions in said step (4) further comprise a condition that, for combinations of color component data represented by respective points on said one edge including said specific point, the differences decrease as a distance from said specific point to the respective points increases.

19. A method in accordance with claim 1, wherein said first color system consists of three color components, and wherein
said specific combination is combination of color component data represented by a specific point on one of four diagonals running through a hexahedron in said color space, eight vertexes of said hexahedron representing eight combinations of color component data, said eight combinations comprising: one combination in which the values of three color components of said first color system are all equal to zero; one combination in which the values of three color components of said first color system are all equal to maximum values; three combinations in which the value of any one color component of said first color system is equal to zero and the values of the other two color components are equal to the maximum values; and three combinations in which the values of any two color components of said first color system are equal to zero and the value of the other one color component is equal to the maximum value.

20. A method in accordance with claim 19, wherein said non-subject combinations comprise said eight combinations.

21. A method in accordance with claim 20, wherein said non-subject combinations further comprise combinations of color component data represented by respective points on twelve edges of said hexahedron.

22. A method in accordance with claim 21, wherein said non-subject combinations further comprise combinations of color component data represented by respective points on six faces of said hexahedron.

23. A method in accordance with claim 22, wherein said conditions in said step (4) further comprise a condition that, for combinations of color component data represented by respective points on one diagonal including said specific point, the differences decrease as a distance from said specific point to the respective points increases.

24. A method in accordance with claim 1, wherein said first color system consists of three color components, and wherein
said specific combination is combination of color component data represented by a specific point on one of six faces of a hexahedron in said color space, eight vertexes of said hexahedron representing eight combinations of color component data, said eight combinations comprising: one combination in which the values of three color components of said first color system are all equal to zero; one combination in which the values of three color components of said first color system are all equal to maximum values; three combinations in which the value of any one color component of said first color system is equal to zero and the values of the other two color components are equal to the maximum values;

and three combinations in which the values of any two color components of said first color system are equal to zero and the value of the other one color component is equal to the maximum value.

25. A method in accordance with claim 24, wherein said non-subject combinations comprise said eight combinations.

26. A method in accordance with claim 25, wherein said non-subject combinations further comprise combinations of color component data represented by respective points on twelve edges of said hexahedron.

27. A method in accordance with claim 26, wherein said non-subject combinations further comprise combinations of color component data represented by respective points on five faces among said six faces of said hexahedron, one face of said hexahedron other than said five faces including said specific point.

28. A method in accordance with claim 27, wherein said non-subject combinations further comprise combinations of color component data represented by respective points on at least one diagonal among four diagonals running through said hexahedron.

29. A method in accordance with claim 26, wherein said non-subject combinations further comprise combinations of color component data represented by respective points on at least one diagonal among four diagonals running through said hexahedron.

30. A method in accordance with claim 1, wherein said first color system consists of three color components, and wherein said specific combination is combination of color component data represented by a specific point in a hexahedron in said color space, eight vertexes of said hexahedron representing eight combinations of color component data, said eight combinations comprising: one combination in which the values of three color components of said first color system are all equal to zero; one combination in which the values of three color components of said first color system are all equal to maximum values; three combinations in which the value of any one color component of said first color system is equal to zero and the values of the other two color components are equal to the maximum values; and three combinations in which the values of any two color components of said first color system are equal to zero and the value of the other one color component is equal to the maximum value.

31. A method in accordance with claim 30, wherein said non-subject combinations comprise said eight combinations.

32. A method in accordance with claim 31, wherein said non-subject combinations further comprise combinations of color component data represented by respective points on twelve edges of said hexahedron.

33. A method in accordance with claim 32, wherein said non-subject combinations further comprise combinations of color component data represented by respective points on six faces of said hexahedron.

34. A method in accordance with claim 33, wherein said non-subject combinations further comprise combinations of color component data represented by respective points on at least one diagonal among four diagonals running through said hexahedron.

35. A method in accordance with claim 32, wherein said non-subject combinations further comprise combinations of color component data represented by respective points on at least one diagonal among four diagonals running through said hexahedron.

36. A method in accordance with claim 1, wherein said step (b) comprises the step of changing the first values of converted color component data for a plurality of specific combination of color component data.

37. A method in accordance with claim 1, wherein said data conversion table converts color component data of said first color system to converted color component data for at least three color components of said second color system, said steps (1) through steps (4) being carried out for each color of said second color system.

38. A method in accordance with claim 1, wherein said equation comprises Laplace's Equation.

* * * * *